(12) United States Patent
Samanta et al.

(10) Patent No.: US 9,807,290 B2
(45) Date of Patent: Oct. 31, 2017

(54) INTERCHANGEABLE USER INPUT CONTROL COMPONENTS

(71) Applicant: HERE Global B.V., Eindhoven (NL)

(72) Inventors: Vids Samanta, Santa Monica, CA (US); Andrew Gartrell, Woodland Hills, CA (US); Rhys Newman, Woodland Hills, CA (US); Jeremy Matters, Valley Village, CA (US); Julian Bleecker, Venice, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/425,548

(22) Filed: Feb. 6, 2017

(65) Prior Publication Data
US 2017/0150024 A1    May 25, 2017

Related U.S. Application Data

(63) Continuation of application No. 14/539,565, filed on Nov. 12, 2014, now Pat. No. 9,602,704.

(51) Int. Cl.
*G03B 11/00* (2006.01)
*H04N 5/225* (2006.01)
*H04N 5/232* (2006.01)
*G06K 9/00* (2006.01)

(52) U.S. Cl.
CPC ....... *H04N 5/2257* (2013.01); *G06K 9/00577* (2013.01); *H04N 5/2254* (2013.01); *H04N 5/2256* (2013.01); *H04N 5/23216* (2013.01)

(58) Field of Classification Search
USPC ....... 396/529, 544, 439; 348/333.06, 333.07, 348/360
See application file for complete search history.

(56) References Cited

U.S. PATENT DOCUMENTS

| | | | | | |
|---|---|---|---|---|---|
| 4,236,803 | A | * | 12/1980 | Shimomura | G03B 7/093 396/298 |
| 5,565,941 | A | * | 10/1996 | Kaneko | G03B 15/05 396/155 |
| 6,341,202 | B1 | * | 1/2002 | Hosokawa | G03B 17/00 396/281 |
| 7,920,179 | B2 | * | 4/2011 | Thorn | H04N 5/2354 348/239 |
| 9,384,495 | B1 | * | 7/2016 | Cope | G06Q 30/0241 |

(Continued)

OTHER PUBLICATIONS

Chapman, DiCAPac WP-One Waterproof Camera Case Review, Jun. 1, 2013, the-gedgeteer.com.

*Primary Examiner* — Clayton E LaBalle
*Assistant Examiner* — Warren K Fenwick
(74) *Attorney, Agent, or Firm* — Lempia Summerfield Katz LLC

(57) ABSTRACT

In one example, a controller of a camera is configured to detect a mechanical connection of an accessory for the camera through data received by a sensor. The accessory includes a physical component that performs a function for the camera. The function may replace an existing function of the camera or supplement an existing function of the camera. The controller identifies one or more identification marks on the accessory to determine an existence of the accessory or a position of the accessory. The controller may disable an existing function of the camera or modify a configuration of the camera based on the identification marks.

20 Claims, 21 Drawing Sheets

(56) References Cited

U.S. PATENT DOCUMENTS

| | | | | |
|---|---|---|---|---|
| 2008/0304818 A1* | 12/2008 | Kranz | ................ | G02B 7/14 396/310 |
| 2011/0304766 A1* | 12/2011 | Bergqvist | ................ | G03B 3/04 348/357 |
| 2015/0286114 A1* | 10/2015 | Sarasmo | ................ | G03B 17/14 348/360 |

* cited by examiner

INTERCHANGEABLE USER INPUT CONTROL COMPONENTS

This application is a continuation under 37 C.F.R. §1.53 (b) and 35 U.S.C. §120 of U.S. patent application Ser. No. 14/539,565 filed Nov. 12, 2014, which is incorporated by reference in its entirety.

FIELD

The following disclosure relates to interchangeable user input control components on a mobile device, or more particularly, systems and algorithms for configuring device operation or user input component control characteristics in response to interchangeable user input control components on a mobile device.

BACKGROUND

The term mobile device encompasses cameras, as well as other devices that include cameras such as smartphones, personal digital assistants, tablet computers, laptop computers, or personal video recorders. Mobile device users typically face a myriad of settings in order to configure a mobile device.

The cameras may include interchangeable accessories such as changeable optic lenses. For those systems where lens or other accessory identification is used, the lens identification is beneficial to optimize camera imaging processes. The most used method to identify a changeable optic lens or other accessory is through an electrical interface from the camera body to the lens unit. Using this electrical interface, the camera may read out data from an integrated circuit inside the accessory through an electrical signal. This is a higher cost technique, as it requires the electrical interface and embedding of the integrated circuit inside the accessory. In addition, electrical interfaces are susceptible to wear and tear, may fail, and are not waterproof.

SUMMARY

In one example, a controller of a camera is configured to detect a mechanical connection of an accessory for the camera through data received by a sensor. The accessory includes a physical component that performs a function for the camera. The function may replace an existing function of the camera or supplement an existing function of the camera. The controller identifies one or more identification marks on the accessory to determine an existence of the accessory or a position of the accessory. The controller may disable an existing function of the camera or modify a configuration of the camera based on the identification marks.

BRIEF DESCRIPTION OF THE DRAWINGS

Exemplary embodiments are described herein with reference to the following drawings.

DETAILED DESCRIPTION

Camera accessories may require some level of configuration by the user. The user may face a myriad of menus search for the proper menu locations to configure the accessory. Some configuration changes may be automatic in that the configuration changes should always be made when the accessory is installed. This scenario may occur when a physical component interferes with the operation of another component of the camera. The following embodiments include algorithms for automatically detecting the accessory and changing camera configurations for the component that the accessory interferes with. In addition, in response to the detection of the accessory, the camera changes configurations related to the use of the accessory.

Figure 1:
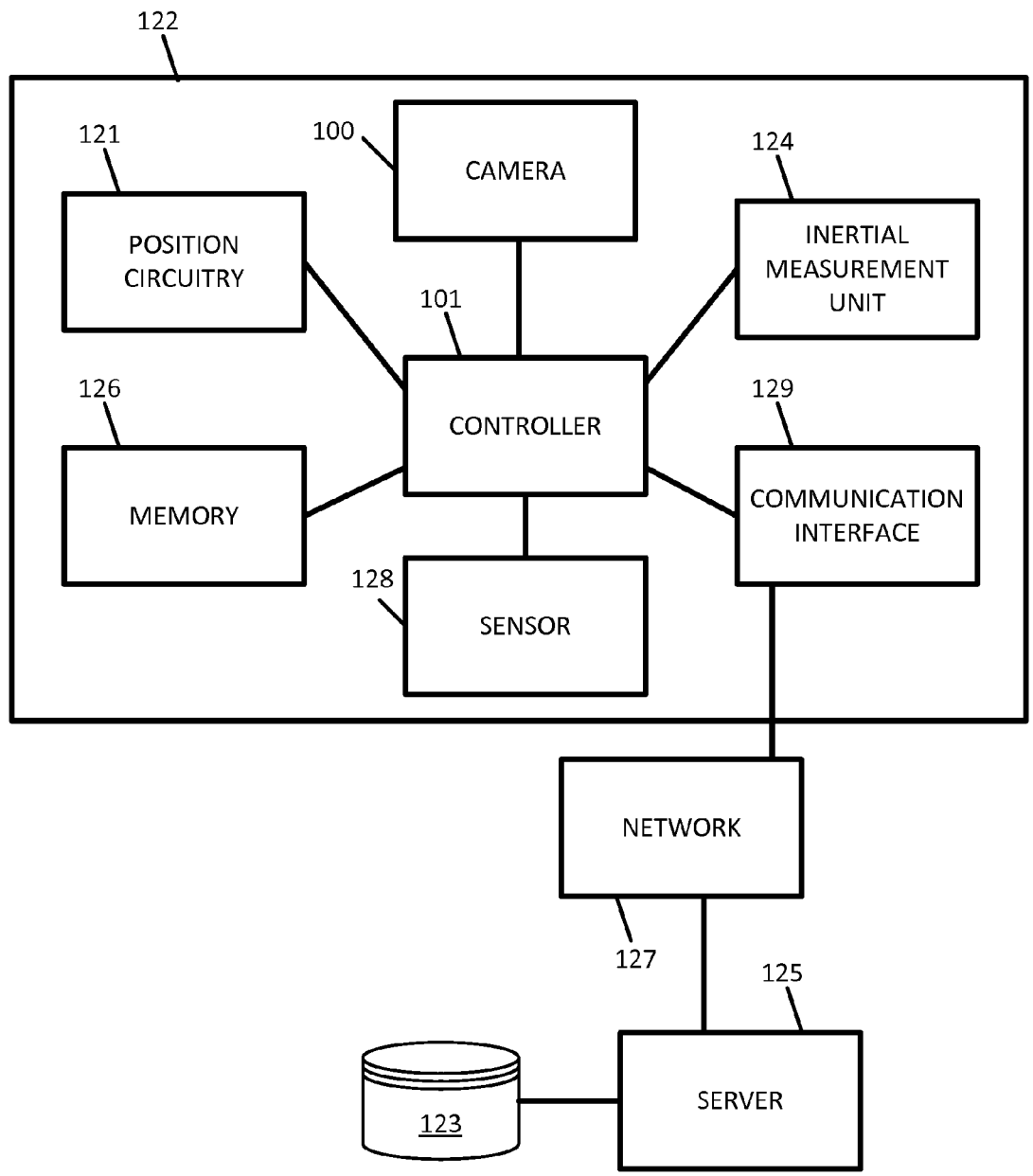
FIG. 1 illustrates an example system for interchangeable user input control components.

FIG. 1 illustrates an example system for interchangeable user input control components. The system includes a computing device 122 integrated with one or more of a camera 100, a sensor 128, a controller 101, position circuitry 121, a memory 126, and an inertial measurement unit (IMU) 124. The computing device 122 may be coupled with a network 127. Additional, different, or fewer components may be provided. For example, many computing devices 122 may connect with the network 127 through the communication interface 129. A display and an input device is not illustrated but included. Multiple cameras 100 may be connected to the computing device 122. In one embodiment, the computing device is coupled to a database 123 and/or map server 125. The database 123 may be a geographic database including road links or segments.

The computing device 122 may be configured to collect video through camera 100. The computing device 122 may display the video on a user interface of the video collection device as the camera 100 collects video. Alternatively, the computing device 122 may re-play video previous collected video or play video stored on the storage medium 126 or downloaded from the network 127. The term camera may be used interchangeably to refer to the entire computing device 122 and, alternatively, to the optical system included in the computing device 122 for capturing image data.

The computing device 122 may include one or more components that receive an accessory. The components may include a groove or other securing mechanism for attaching the accessory to the computing device 122. When the accessory is secured in place, the sensor 128 detects the existence of the accessory and reads one or more identification marks from the accessory. The identification marks identify the accessory. Alternatively, marks that describe specific commands or configuration changes may be read from the accessory by the sensor 128. The identification marks may be laser etched. The identification marks may have a very small resolution (e.g., line width of 0.001 inches or resolution of 1000 to 10000 dpi).

The accessory may interfere with an operation of the camera 100. For example, a physical component of the accessory may block or cover another component. The accessory may make a function of the camera 100 obsolete. For example, when an external flash or filter are attached to the camera 100, built in flashes or internal filters become unnecessary.

The controller 101 may receive data indicative of the identification marks from the sensor 128. The controller 101 may interpret the identification marks to determine the type of the accessory installed on the camera 100. The controller 101 may access a lookup table that associates identification marks or accessory types with functions of the accessory. The lookup table may associate accessories with functions of the camera 100 that should be disabled or modified upon installation of the accessory. In this way, the controller 101 may modify a configuration of the camera based on the identification marks. The configuration may be based on the physical component of the accessory. For example, a collection of dials or other accessories may be interchangeably swapped out (installed and removed from the camera 100), and the controller 101 may identify the dials as they are installed, and modify the operation of the camera 100 accordingly.

Figure 2:
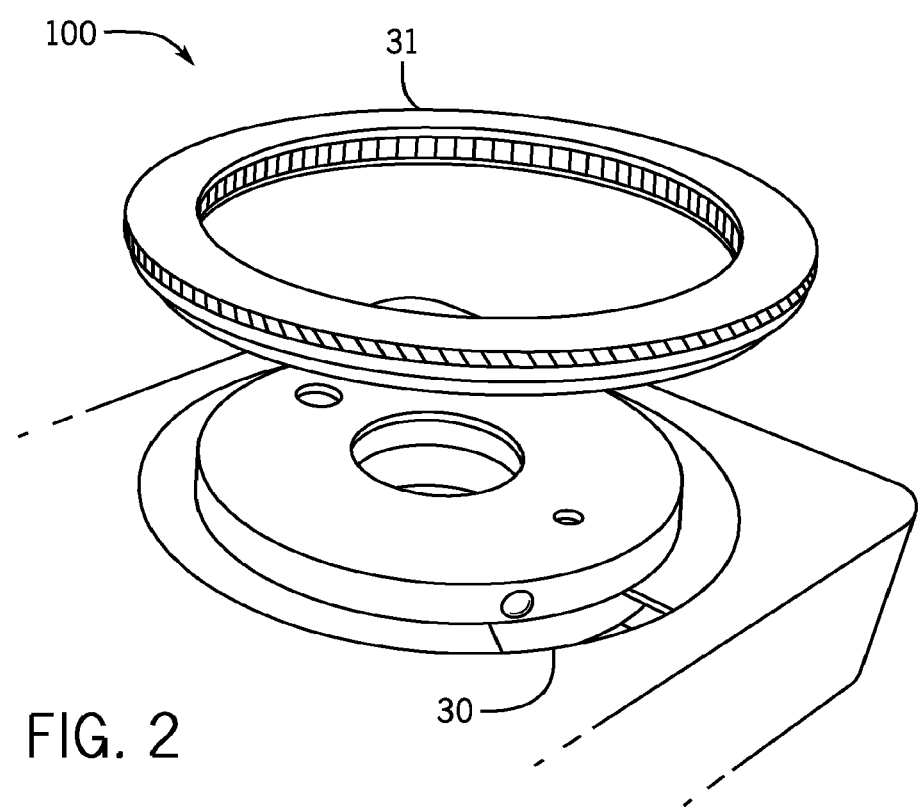
FIG. 2 illustrates an example interchangeable dial.

FIG. 2 illustrates an example interchangeable dial 31. The dial 31 may adjust types of metadata that is stored with or overlaid on photographs captured by the camera 100. For example, the camera 100 may select location data with the photographs when the dial is one position and select timestamps with the dial 31 is in another position. Rotating the dial 31 may scroll the metadata through various combinations of geographic coordinates, street address, distance to a particular location, weather, altitude, speed, acceleration or other data. Rotating the dial 31 may toggle the metadata on and off. The dial 31 allows the user to quickly add or remove information from the captured images.

The sensor 128 may be an image sensor including a charge coupled device (CCD) or photodiode. The detection area of the sensor 128 may have a predetermined size (e.g., 19 pixels or 19 pixels). The sensor 128 may be about 10 millimeters (mm) by 2 mm by 2 mm. The sensor 128 may be behind window 30, which may be waterproof. The sensor 128 may detect the dial 31 as it is snapped into place on the camera 100. The sensor 128 may read one or more identification marks on the dial 31. In response to reading the identification marks, the controller 101 may disable other menus or functions for selecting the metadata.

Figure 3:
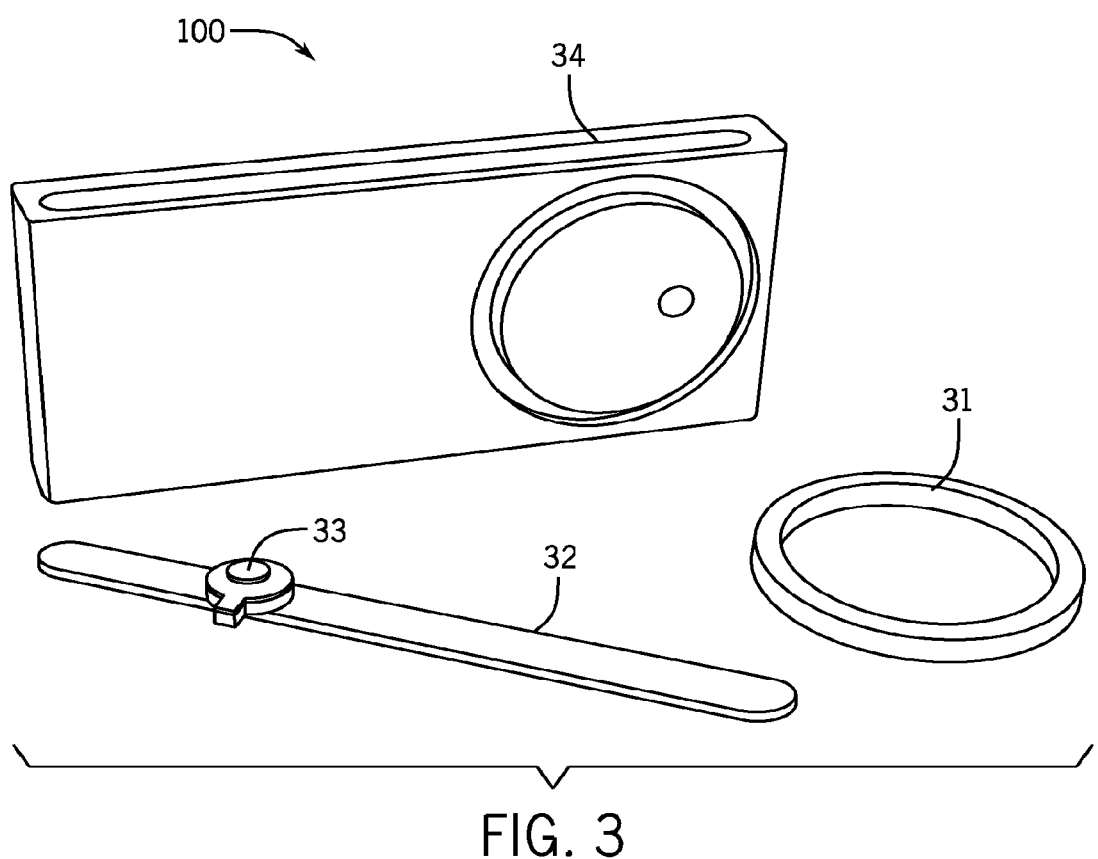
FIG. 3 illustrates an example interchangeable dial and an example interchangeable trigger.

FIG. 3 illustrates an example interchangeable dial 31 and an example interchangeable trigger 33. The trigger 33 is mounted on a plate 32. The plate 32 fits into grove 34. The bottom of the plate 32 may include identification marks, and the sensor 128 may read the identification marks through a window in the groove 34. The plate 32 may function as a zoom control. In one example, the trigger 33 slides along the plate. The position of the trigger 33 may be detected by the sensor 128 or another sensor.

The controller 101 is configured to set a zoom level for capturing images based on the position of the trigger 33. In another example, the plate 32 may be a touch sensor. A user may slide a finger along the plate to determine the zoom level. For example, from any starting position on the plate 32, sliding to the right increases the zoom, and sliding to the left decreases the zoom. In response to installation of the trigger interface (e.g., plate 32), the controller 101 configures a touch control of the trigger interface.

In response to reading the identification marks on the plate 32, the controller 101 may enable a mode that receives zoom level inputs. In response to reading the identification marks on the plate 32, the controller 101 may disable the default zoom control for the camera 100.

Figure 4:
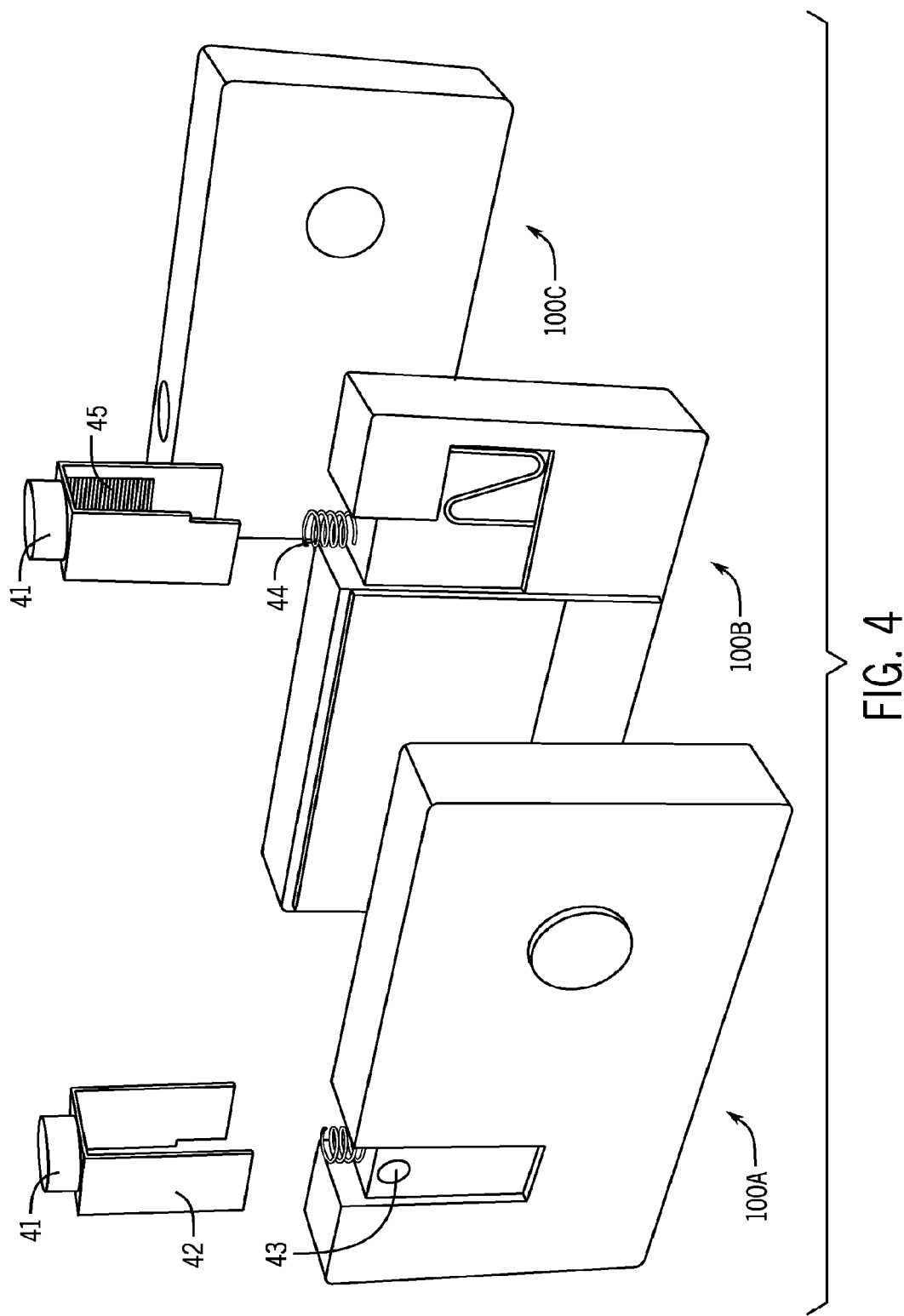
FIG. 4 illustrates another example interchangeable trigger.

FIG. 4 illustrates another example interchangeable trigger 41. Several views 100A-C are illustrated. View 100A illustrates a disassembled camera from the front. View 100B illustrates a disassembled camera from the back. View 100C illustrates an assembled camera. One panel 42 of the interchangeable trigger 41 includes one or more identification marks 45 on the internal surface that is read by an optical sensor through the window 43. A spring 44 provides resistance to the interchangeable trigger 41 to bias the trigger 41 in a particular position.

The trigger 41 may have a predetermined number of settings indicated by the identification marks 45, and the controller 101 may activate a mode for the predetermined number of settings in response to the detection of the identification marks 45. The trigger 41 may be a single stage push button. For example, the camera 100 may capture an image in response to the trigger 41 being depressed. The sensor may detect the movement of the trigger 41, and as a result the controller 101 captures an image. In another example, the trigger 41 may be a multi-staged trigger. One position of the trigger may trigger one function and another position may trigger another function. For example, a first position may cause a flash timer to start or a focus process to start and a second position may cause the camera 100 to capture the image. A first position may cause focusing or flashing, a second position may cause the camera to begin capturing a burst or series of images, and a third position may cause the camera to stop capturing the burst or series of images.

Figure 5A:
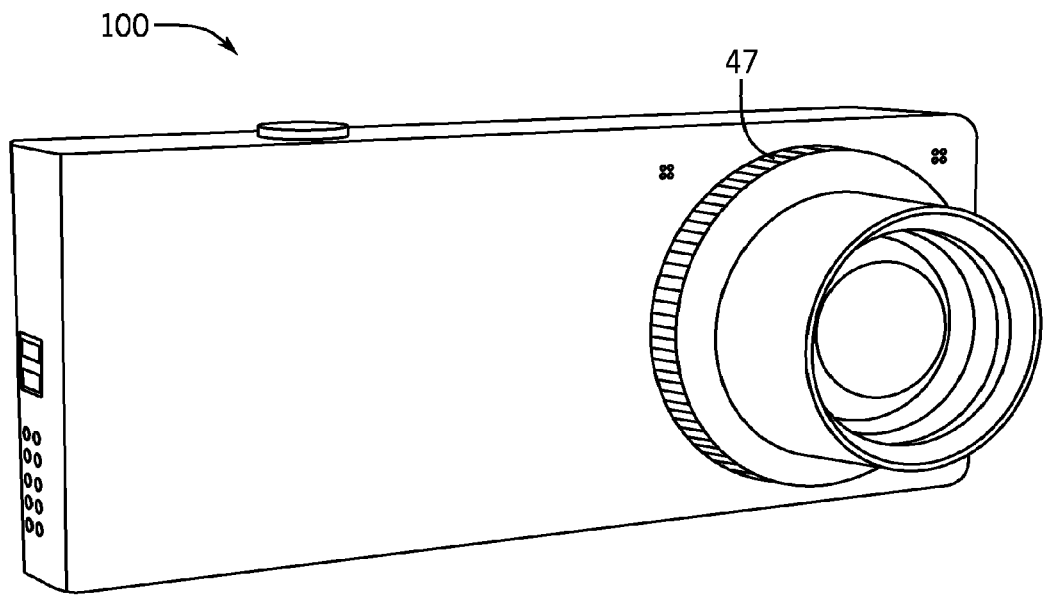
FIG. 5A illustrates an example interchangeable lens.

FIG. 5A illustrates an example interchangeable lens 47. The lens 47 may a wide angle lens. The wide angle lens may have one or more dimensions (e.g., lens radius) that are greater than the default lens. Thus, the wide angle lens may interfere with other components of the camera 100. For example, the wide angle lens may block a flash. Accordingly, the controller 101 may be configured to identify the wide angle lens from the identification marks and disable the flash of the camera 100 because the wide angle lens interferes with the flash. In addition, the controller 101 may load one or more configurations for optimizing the imaging pipeline for wide angle optics. For example, the controller may remove a portion of the image captured by the wide angled lens. The removed portion may be the top rows of pixels (e.g., top 10 rows or top 1%) and/or the bottom rows of pixels (e.g., bottom 10 rows or bottom 1%).

Figure 5B:
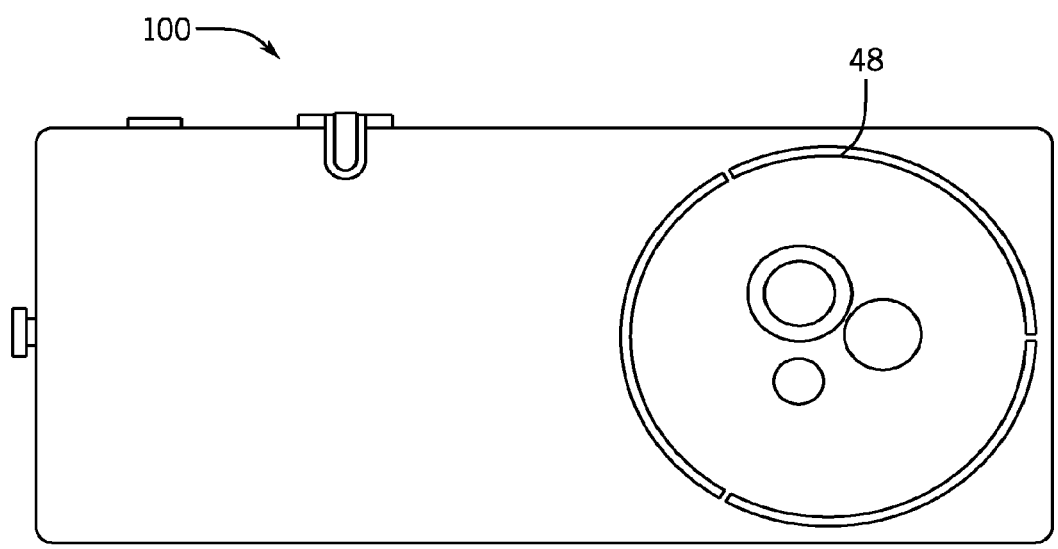
FIG. 5B illustrates another example interchangeable lens.

FIG. 5B illustrates another example interchangeable lens 48. The lens 48 may be a multiple lens array. The multiple lens array may have two lenses and an off position as shown or any number of lenses. The different lens may provide different zoom ranges, different focal lengths, or vary another lens attribute. In one example, one of the lenses is specialized for night time photography or for up-close (macro) photography. The position of the lens 48 may be detected by the sensor. For example, different identification marks may be arranged around the circumference of the lens 48 such that the controller 101 may identify which of the lenses in the array is aligned with the primary lens of the camera 100. Accordingly, the controller 101 may be configured to enable a mode (e.g., night time mode or macro mode) for one of the lenses in the multiple lens array based on information and position of the identification marks. In one example, the controller 101 may identify when the dial has been rotated to an off position (no lens) and disable all functionality of the camera 100 or initiate a standby mode.

Figure 6A:
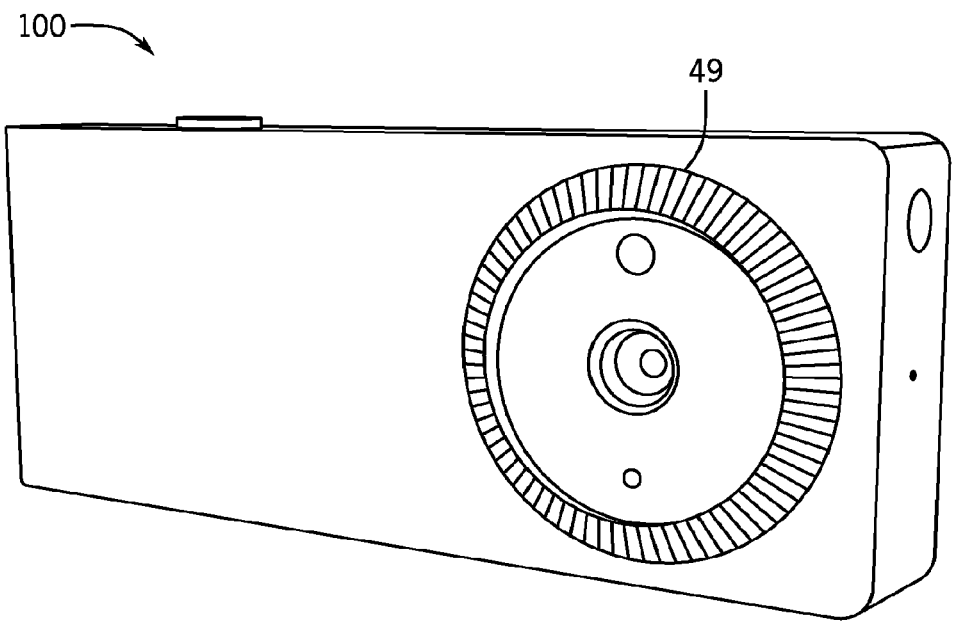
FIG. 6A illustrates an example interchangeable dial.

FIG. 6A illustrates an example interchangeable dial 49. Dial 49 may be a tactile dial. The tactile dial has a larger grip than the default dial. The tactile dial facilitates ease of use when the user is wearing gloves or otherwise has a compromised sense of touch. When wearing gloves, users may prefer a less sensitive dial (i.e., more rotation of the dial is required to cause the same change in input). The controller 101 may be configured to decrease the sensitivity of a control input in response to the detection of the tactile dial. For example, if the control input is zooming, the tactile dial may be rotated one half of a rotation to cause the same degree of zoom that the default dial would cause with one quarter of a rotation. In another example, when the dial 49 causes the camera to scroll through metadata (e.g., location, speed, time, or others) to be overlaid on the image, the tactile dial may cause the metadata to increment in response to every 20 degrees of rotation, while the default dial would cause the camera to increment metadata for every 10 degrees of rotation.

Figure 6B:
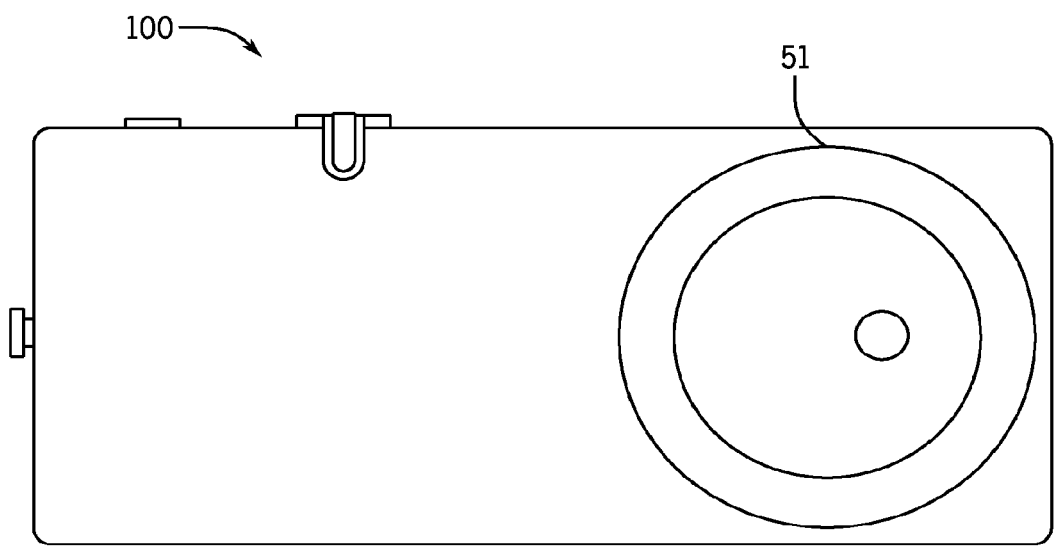
FIG. 6B illustrates another example interchangeable dial.

FIG. 6B illustrates another example interchangeable dial 51. The dial 51 may a power saving dial. The power saving dial may cause the camera 100 to disable one or more functions to save power. When the controller 101 receives the identification marks of dial 51, the controller 101 may disable wireless communication, the back light display, or other functions. Thus, the user may snap dial 51 onto the camera rather than navigation the on-screen settings of the camera 100.

The dial 51 may be formed of metal. The metal may interfere with the wireless communication of the camera. Wireless communication may include the family of protocols known as WiFi or IEEE 802.11, the family of protocols known as Bluetooth, the family of protocols knows as near field communication (NFC), cellular technologies (analog advanced mobile phone system (AMPS), the global system for mobile communication (GSM), third generation partnership project (3GPP), code division multiple access (CDMA), personal handy-phone system (PHS), and 4G or long term evolution (LTE) standards), or another protocol. Because the dial 51 has a property (e.g., metal shields radio signals) that interferes another component (e.g., antenna) of the camera 100, the controller 101 may be configured to disable wireless communication in response to receiving identification marks indicative of dial 51.

Figure 7A:
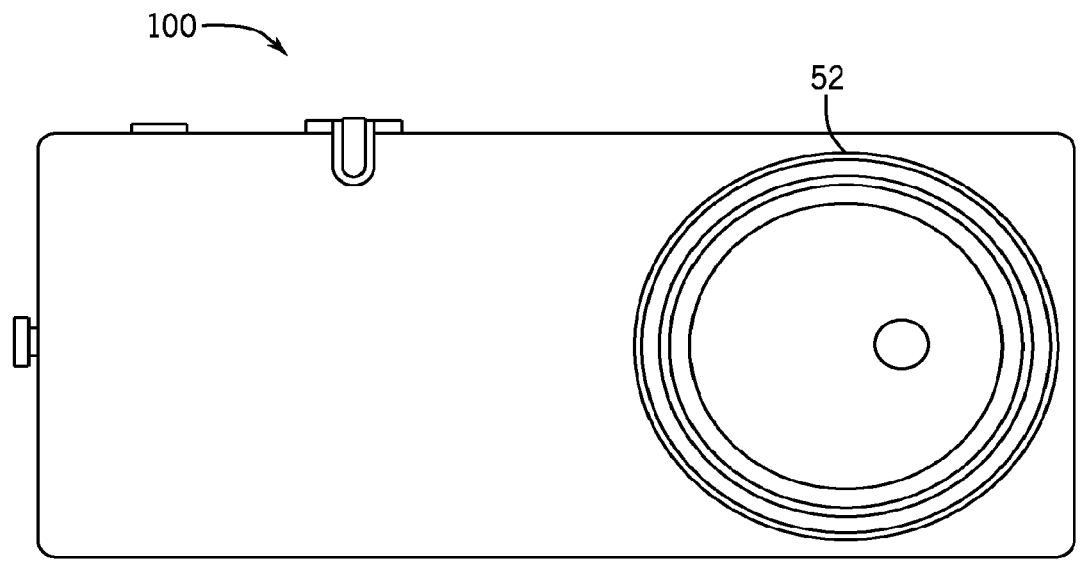
FIG. 7A illustrates an example interchangeable flash.

FIG. 7A illustrates an example dial 52 with an interchangeable flash. The flash may be a ring flash or another type of specialty flash for adding affects to the images. The specialty flash would interfere with the default flash, or vice versa, of the camera 100. Accordingly, the controller 101 may be configured to identify the specialty flash from the identification marks and disable the flash of the camera 100. In addition, the controller 101 may load one or more configurations for effects associated with the specialty flash.

Figure 7B:
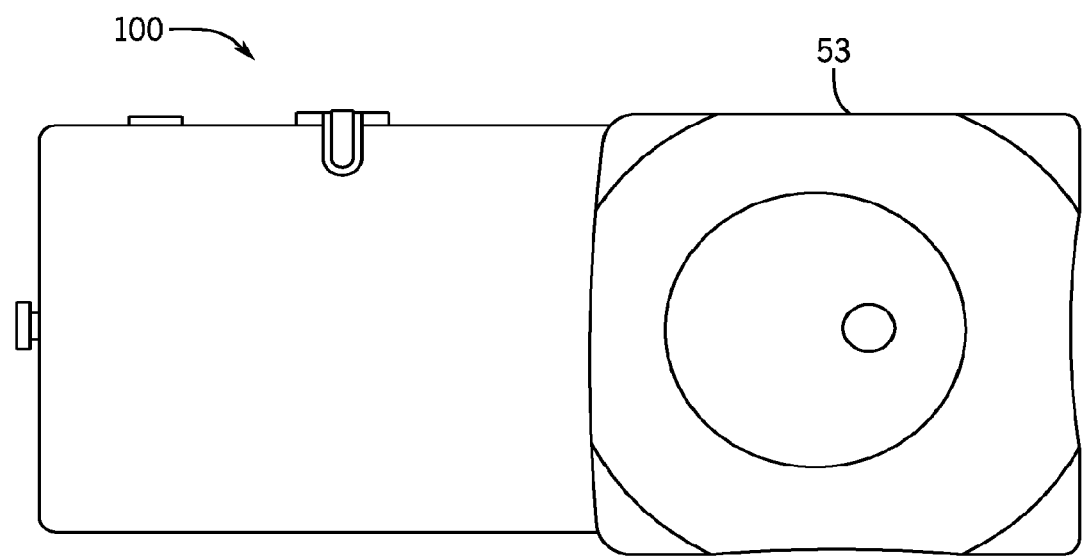
FIG. 7B illustrates an example interchangeable filter hood.

FIG. 7B illustrates an example interchangeable filter hood 53. The filter hood 53 may be configured to hold one or more image filters. The image filters may eliminate a predetermined range of wavelengths from the captured image. Example filters for the filter hood 53 may include a polarizing filter, a natural density filter, a soft edge filter, a haze filter, and an ultraviolet or skylight protection filter. Others filters may add affects such as colored filters, warming filters, or cooling filters. The controller 101 may be configured to identify the filter hood from the identification marks and disable a software filtering function of the camera 100. The physical filtering in the filter hood 53 may interfere with software filtering internal the camera 100, or vice versa. In addition, the controller 101 may load one or more configurations for effects associated with the filter hood 53. In one example, the identification marks are prints on the filters themselves.

Any of the cameras described herein may collect media (e.g., video, audio, or both) and with metadata collected by the computing device 122. The position circuitry 121 may generate location data (e.g., latitude and longitude coordinates) associated with a current position of the computing device 122. The location data may be stored in a file (e.g., in storage medium 126) with the video collected by the camera 100. For example, each frame may be associated with a location stamp. Each frame may also be associated with a time stamp. In one example, the computing device 122 displays the location data overlaid on the video. The computing device 122 may calculate the speed of the computing device 122 based on a sequence of location data (e.g., the derivative of location data).

The media may be supplemented with metadata collected by the IMU 124. The IMU 124 may include one or more of an accelerometer, a gyroscope, and a magnetic sensor. The IMU 124 may calculate one or more of heading data, speed data, acceleration data, or orientation data of the computing device 122 ("motion data"). The motion data may be stored in a file (e.g., in storage medium 126) with the video collected by the camera 100. For example, each frame may be associated with a motion data stamp. In one example, the computing device 122 displays the motion data overlaid on the video. Other metadata may be collected such as temperature, pressure, and altitude.

The computing device 122 may transmit the video, the location data, and the motion data to the server 125 via the network 127. The server 125 may store video including time stamps, location stamps, and/or motion stamps in the database 123. In another example, the computing device 122 may report current locations of the computing device 122 to the server 125, which accesses geographic data from the database 123. For example, the server 125 may send map information (e.g., road segments, nodes, and points of interest) to the computing device 122.

As alternatives to a standalone media device, the computing device 122 may be a smart phone, a mobile phone, a personal digital assistant ("PDA"), a tablet computer, a notebook computer, a personal navigation device ("PND"), a portable navigation device, and/or any other known or later developed portable or mobile computing device.

The phrase "coupled with" is defined to mean directly connected to or indirectly connected through one or more intermediate components. Such intermediate components may include hardware and/or software-based components. The computing resources may be divided between the server 125 and the mobile device 122. In some embodiments, the server 125 performs a majority of the processing. In other embodiments, the mobile device 122 or the workstation 128 performs a majority of the processing. In another example, the processing is divided substantially evenly between the server 125 and the mobile device 122 or workstation 128.

Figure 8:
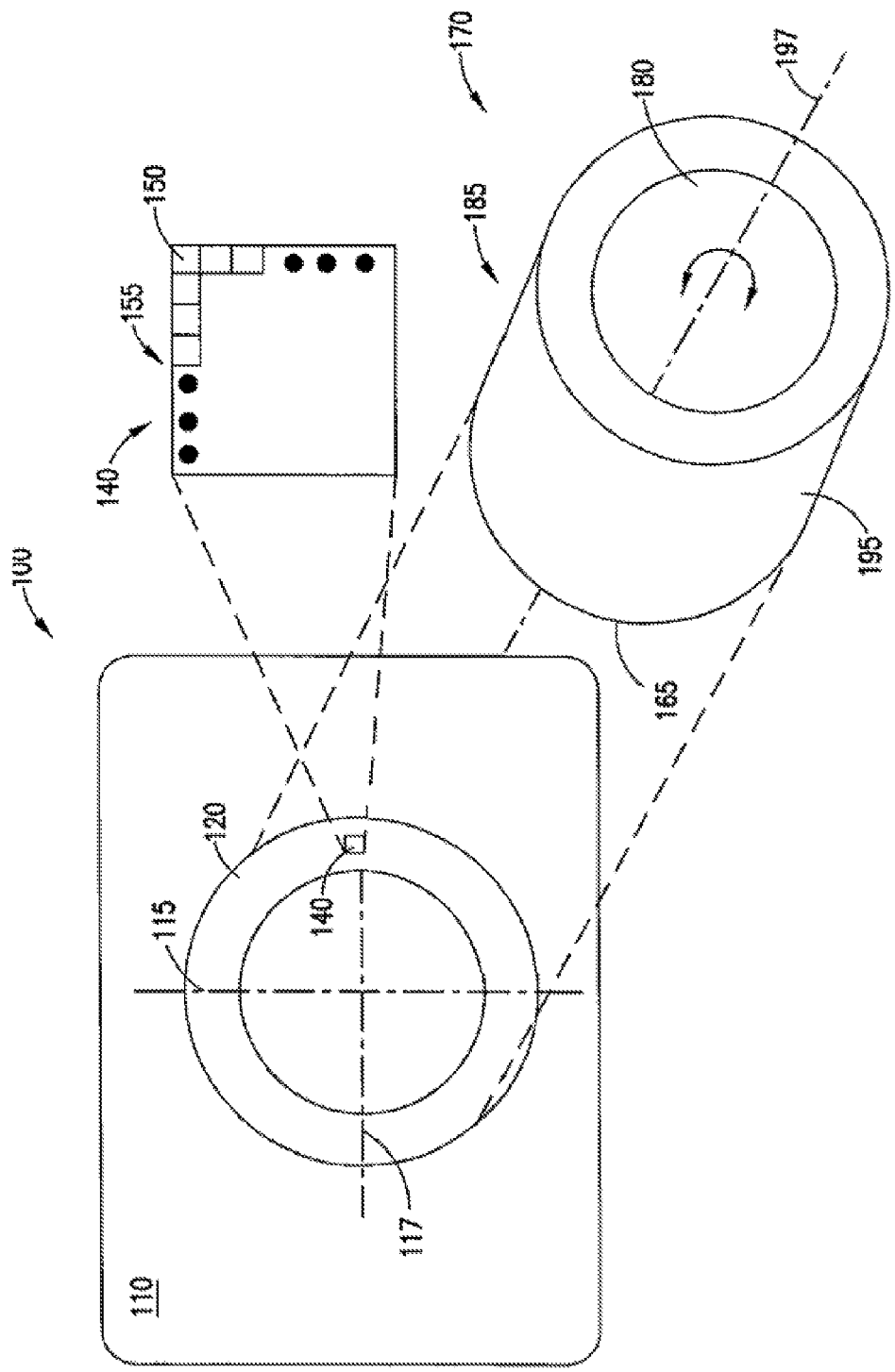
FIG. 8 illustrates a portable device in accordance with an exemplary embodiment.

FIG. 8 illustrates a portable device in accordance with an exemplary embodiment. The computing device is a camera 100 that has a body 110, which has an optical axis 197 and has an optical plane formed coextensive with axes 115 and 117 over which an optical accessory such as lens accessory 170 would be placed. The lens accessory 170 comprises a body 185 having an accessory mating surface 165 that mates with an accessory mating surface 120 on the body 110 of the camera 100. The lens accessory 170 includes a lens portion 180 that aligns at least in part with the optical plane coextensive with axes 115 and 117.

The body 110 of the camera 100 includes a matrix sensor 140 incorporated into the accessory mating surface 120. The matrix sensor 140 includes a two-dimensional array 155 of pixels 150 (e.g., 19 by 19 pixels). The matrix sensor 140 detects identification pattern(s) formed into or on the accessory mating surface 165 of the accessory 170. The body 185 may comprise a barrel 195 that, when rotated, also causes the accessory mating surface 165 to rotate relative to the accessory mating surface 120 and, e.g., around the optical axis 197 about which the body 185 (or a portion thereof) rotates.

Figure 9:
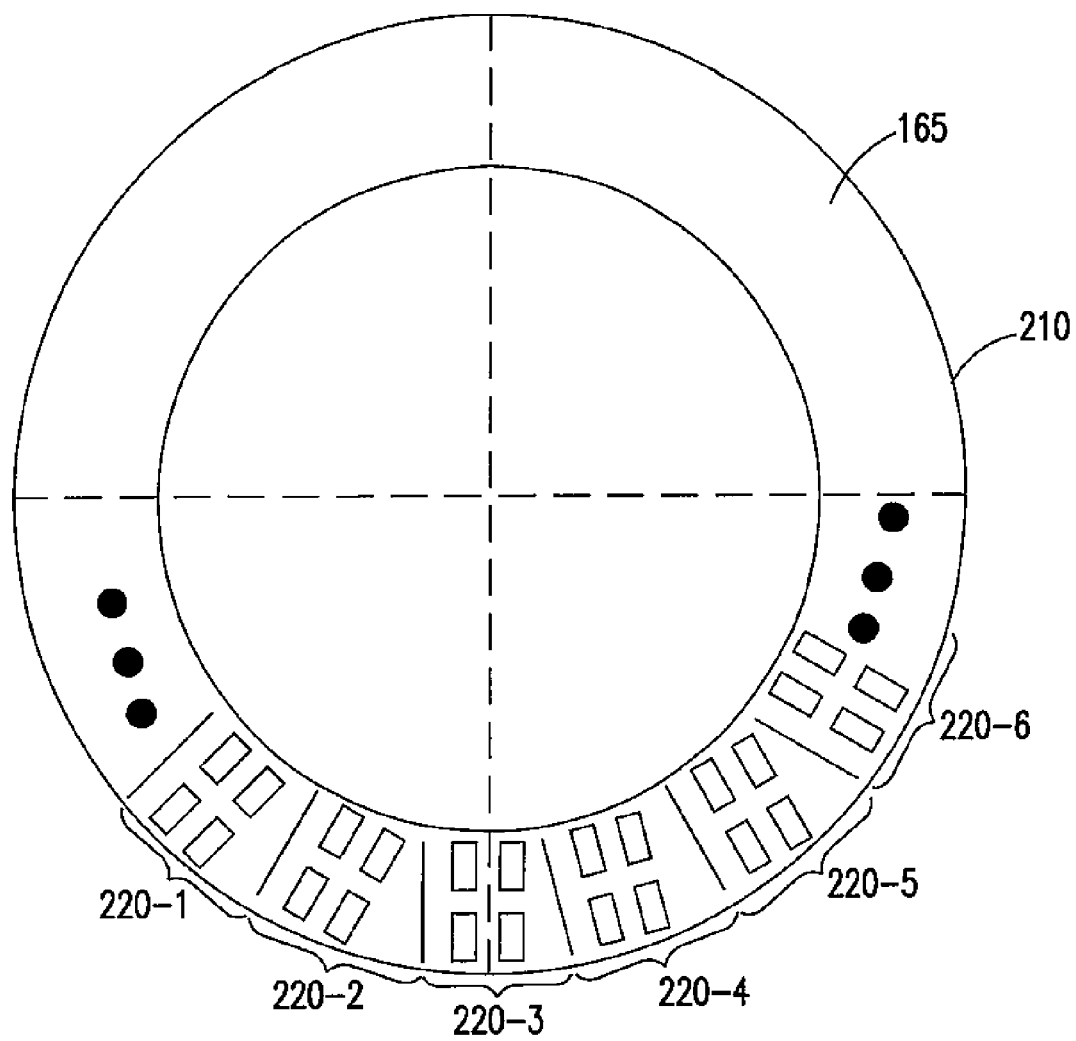
FIG. 9 illustrates an example of optical identification patterns formed in a perimeter area of the accessory mating surface of the accessory.

FIG. 9 illustrates an example of identification marks or ID patterns 220 formed adjacent a perimeter 210 of the accessory mating surface 165 of the accessory 170. In this example and explained in additional detail below, the ID patterns 220 include a plurality of two-dimensional arrays of optically-recognizable identification marks 220-1 to 220-6 and an additional optically-recognizable identification mark used as a synchronization feature (a line in this example).

Figure 10:
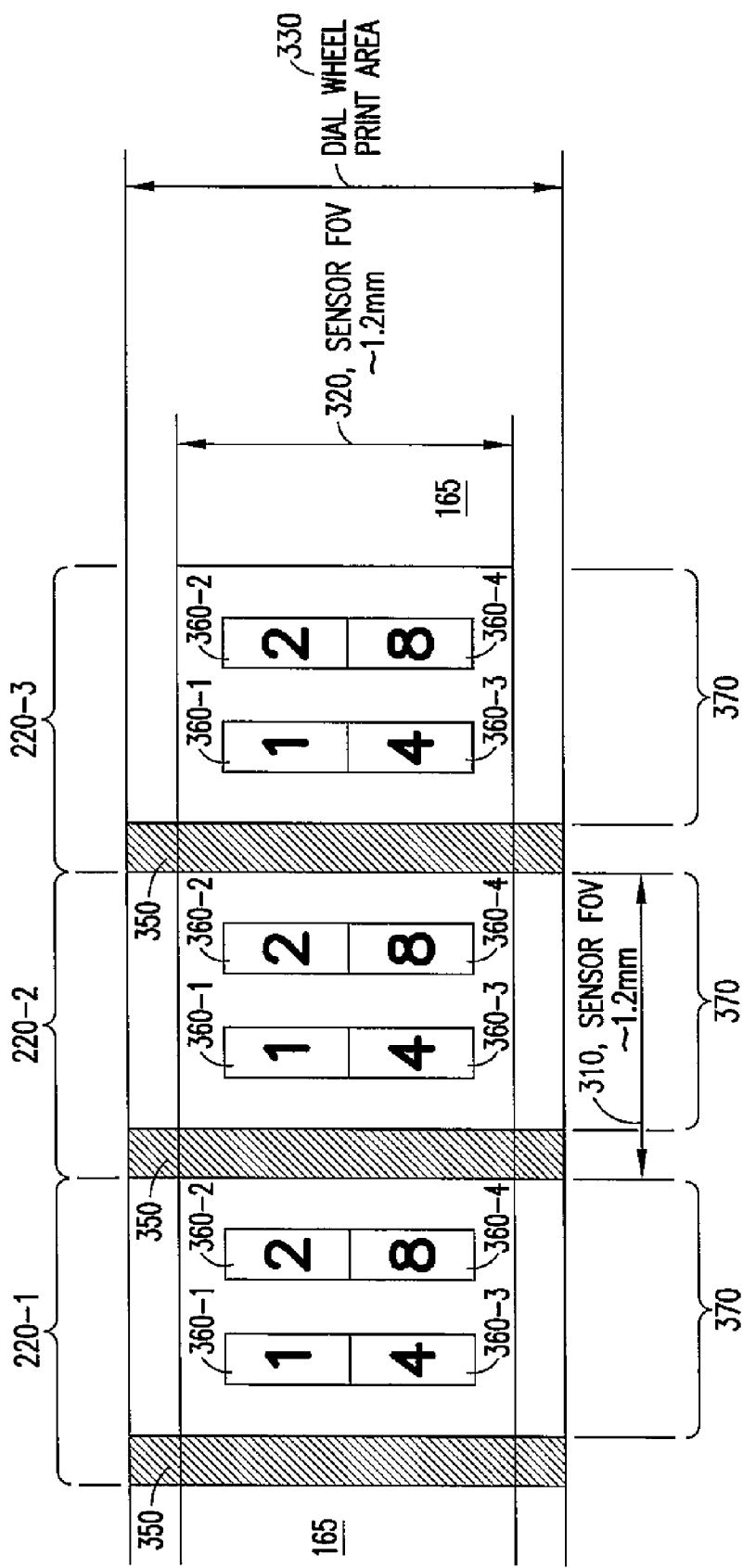
FIG. 10 illustrates another example of optical identification patterns formed in a perimeter area of the accessory mating surface of the accessory.

FIG. 10 provides another example of optical identification patterns formed in a perimeter area of the accessory mating surface of the accessory. The ID patterns 220 include an optically-recognizable identification mark 350 that is used as a synchronization feature, so that a portable device such as camera 100 can determine where the locations 360 and area 370 is. Area 370 is an area sized to hold at least a two-dimensional array of locations 360. Each location 360 is sized to hold a second optically-recognizable identification mark formed as part of the mating surface 165. A sensor field of view (FOV) 320 in a vertical direction is shown, and this sensor FOV 320 is about 1.2 mm in this example. A dial wheel (e.g., as part of the barrel 195) print area 330 is also shown, and such print area 330 might be an outer area (adjacent the perimeter 210) of the mating surface 165. A dial wheel is in an exemplary embodiment a rotating portion of the accessory 170 and the dial wheel may or may not have an additional lens and may or may not have external markings (that is, markings on an outside of the barrel 195). A dial wheel may also be a fixed portion of the accessory 170. As accessories 170, there are other lenses that go on in place of the dial wheel. For example, an accessory zoom lens may be an option. The sensor FOV 310 in a horizontal direction is about 1.2 mm in this example. The optically-recognizable identification mark 350 and the area 370 are configured such that the area 370 is at a predetermined physical relationship to the optically-recognizable identification mark 350. The optically-recognizable identification mark 350 is like a "sync" (synchronization) line in this particular pattern. The sync line helps an algorithm used by a portable device to detect and locate the area 370 containing actual data bits in the locations 360. As the accessory 170 may be a fully 360-degree rotatable system, the sync line is helpful to detect actual data. This is related to this particular pattern and coding method.

In this example, the location 360-1 corresponds to a value of one, the location 360-2 corresponds to a value of two, the location 360-3 corresponds to a value of four, and the location 360-4 corresponds to a value of eight. The optically-recognizable identification marks in the locations 360-1 could be nothing (e.g., a flat surface), which might be interpreted as a zero, or a feature, which might be interpreted as a one.

Figure 11:
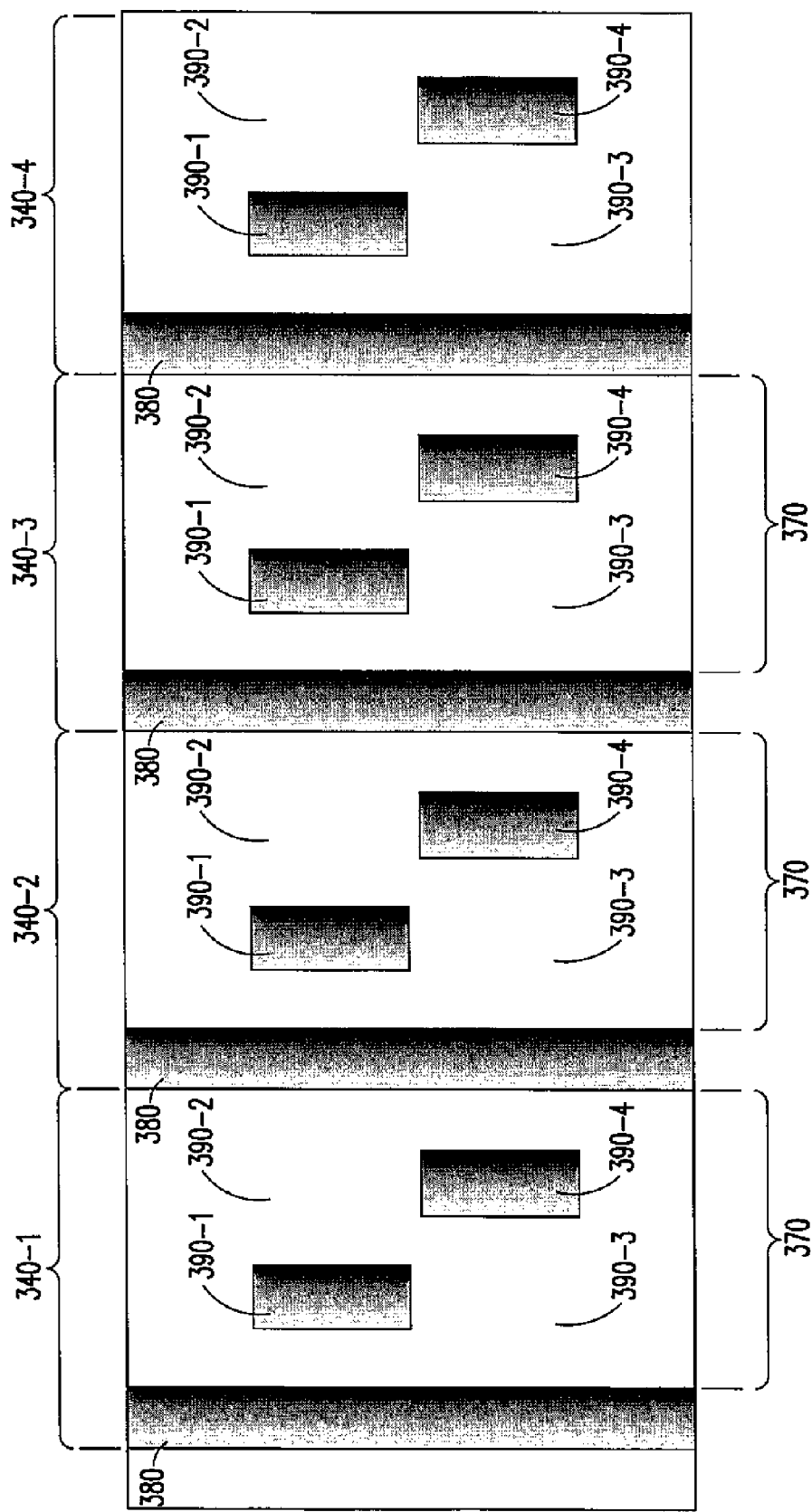
FIG. 11 illustrates a specific example of an optical identification pattern using the patterns in FIG. 10.

FIG. 11 illustrates a specific example of an optical identification pattern using the patterns in FIG. 10. The optically-recognizable identification marks 390 correspond to the locations 360. In this case, the optically-recognizable identification marks 390-1 and 390-4 have optically-recognizable features as a raised area, whereas the optically-recognizable identification marks 390-2 and 390-3 are flat areas (which are optically-recognizable as such or at least as not being raised areas). Based on the value assignment described above with respect to FIG. 10, the value associated with this accessory is nine, since the raised area for 390-1 corresponds to location 360-1, which corresponds to one, and the raised area for 390-4 corresponds to location 360-4, which corresponds to eight. It is noted that the raised area 380 corresponds to the optically-recognizable identification mark 350, and the raised area 380 may be used as a sync line and also used to determine the location of the corresponds area 370.

Figure 12A:
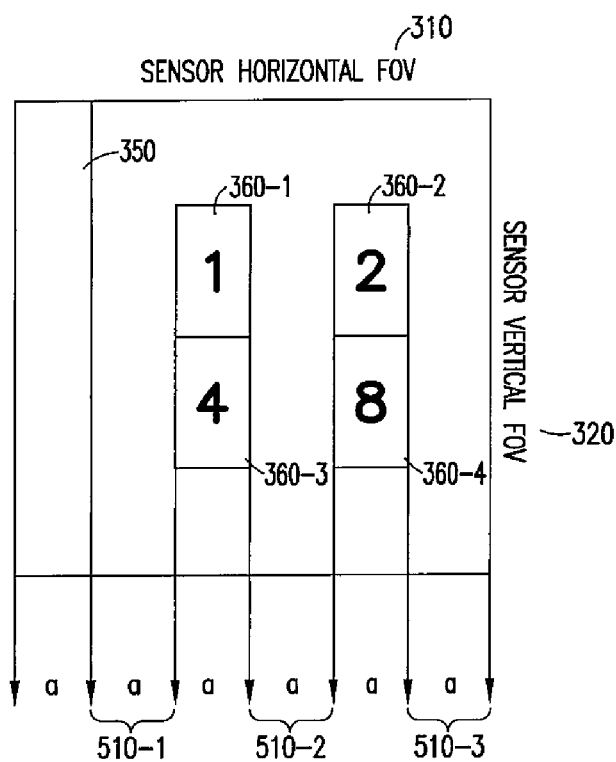
FIG. 12A illustrates another example of a single optical identification pattern formed in a perimeter area of the accessory mating surface of the accessory.
Figure 12B:
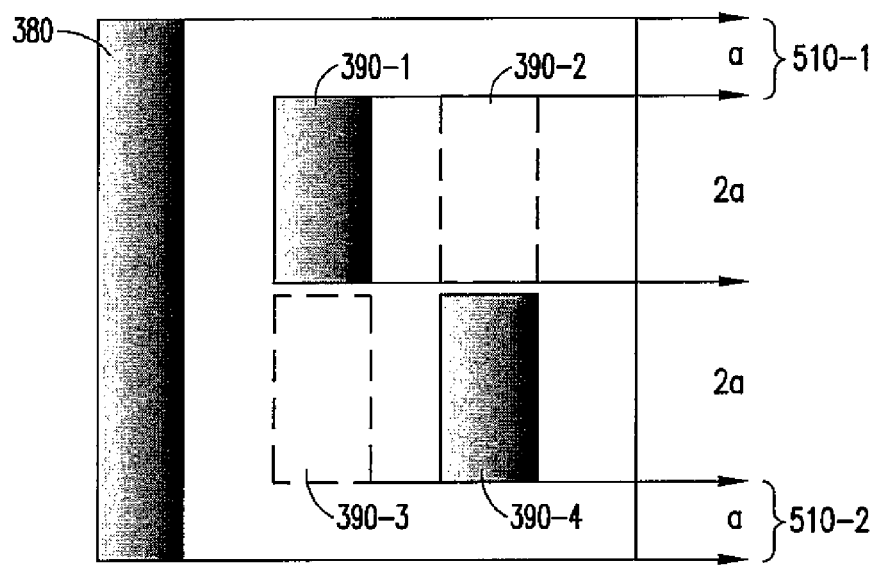
FIG. 12B illustrates a specific example of an optical identification pattern using the pattern in FIG. 12A.

FIG. 12A illustrates another example of a single optical identification pattern formed in a perimeter area of the accessory mating surface of the accessory, while FIG. 12B illustrates a specific example of an optical identification pattern using the pattern in FIG. 12A. This example shows equal spacing (a), which is matched with the FOV of the sensor 140. The FOV estimate is ~1.2 mm. Therefore, a=1.2 mm/6=0.2 mm, and this is equal to the size of each space 510 (of which spaces 510-1, 510-2, and 510-3 are shown) and size of the locations 360 and the corresponding markings 390-1 and 390-4. In the vertical direction, the size of the locations 360 and the corresponding markings 390 are about 2a (see FIG. 12B) or 0.4 mm and the spaces 520-1 and 520-1 are about a. Thus, the locations 360 and corresponding markings 390 (and spaces 510/520 and marking 350/380) are related to the FOV.

The identification patterns described above are merely exemplary. One may have just lines, an algorithm might count how many lines are seen, or there may even be different shapes to detect, or shape(s) and line(s) may be used together. This is very flexible, as an ID pattern is detected by capturing a "picture" of that ID pattern by using a miniature camera type of sensor 140.

The complexity of the ID pattern is related to how many different IDs are to be detected. If it is desired to detect just two different types, then one may use simple lines in the accessory 170, e.g., one line equals "type 1", two lines equals "type 2". This system could be very simple.

Figure 13:
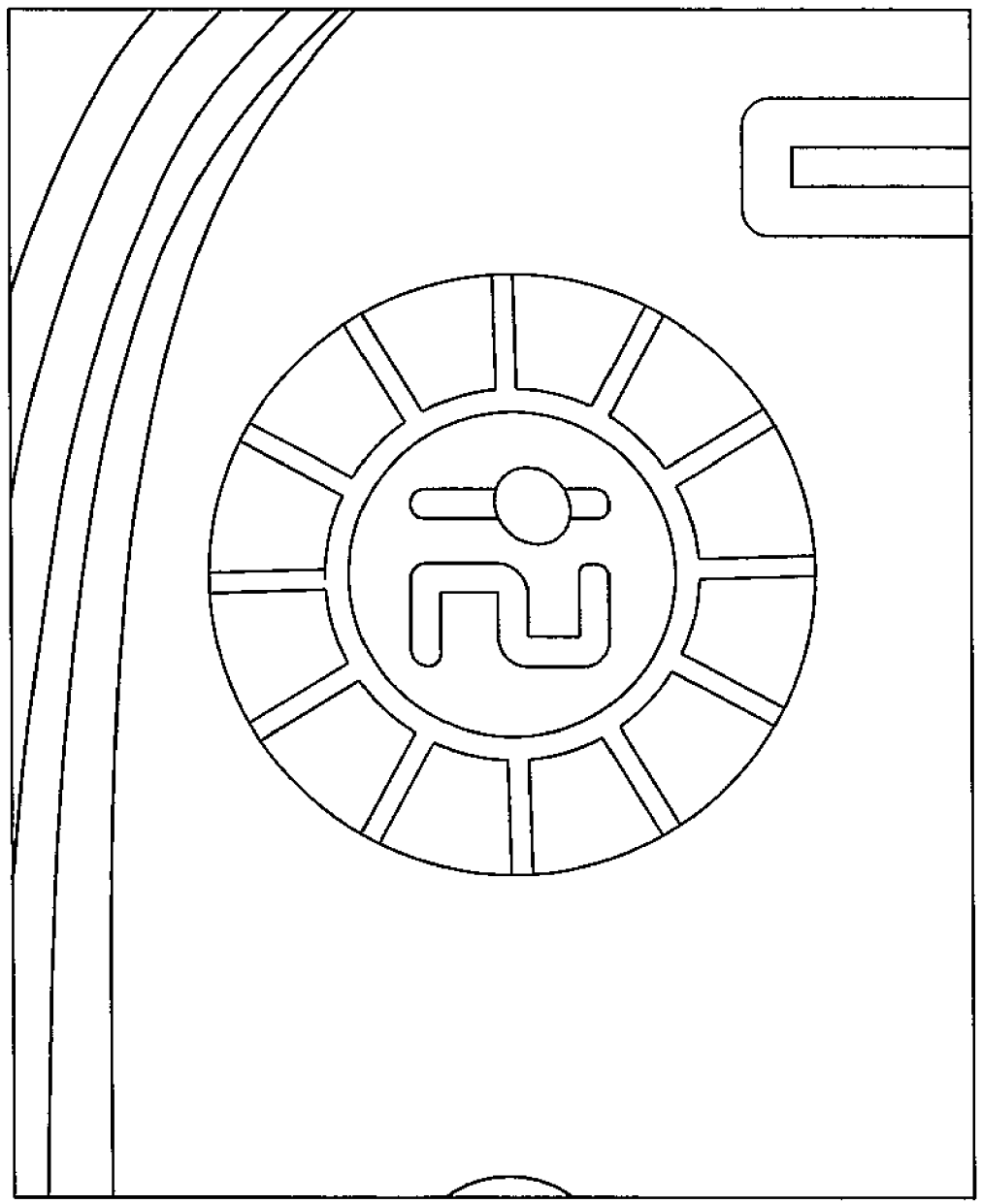
FIG. 13 illustrates another possible identification pattern.

However, if there are more ID patterns to detect, such as having 10 or more ID patterns to be detected, then some kind of data pattern and more complex system is needed. The ID pattern can be also be any shape. For example, circle="type 1", square="type 2" and the like. Furthermore, the ID pattern may be like a decorative pattern which has ID information inside. For example, see FIG. 13, which illustrates another possible identification pattern. In this case, the number "21" is located in a center circle surrounded by additional markings. The ID pattern might be printed, e.g., by using a laser to change surface color, or might be created using surface flatness variation, e.g., meaning very small holes/lines/forms.

Figure 14:
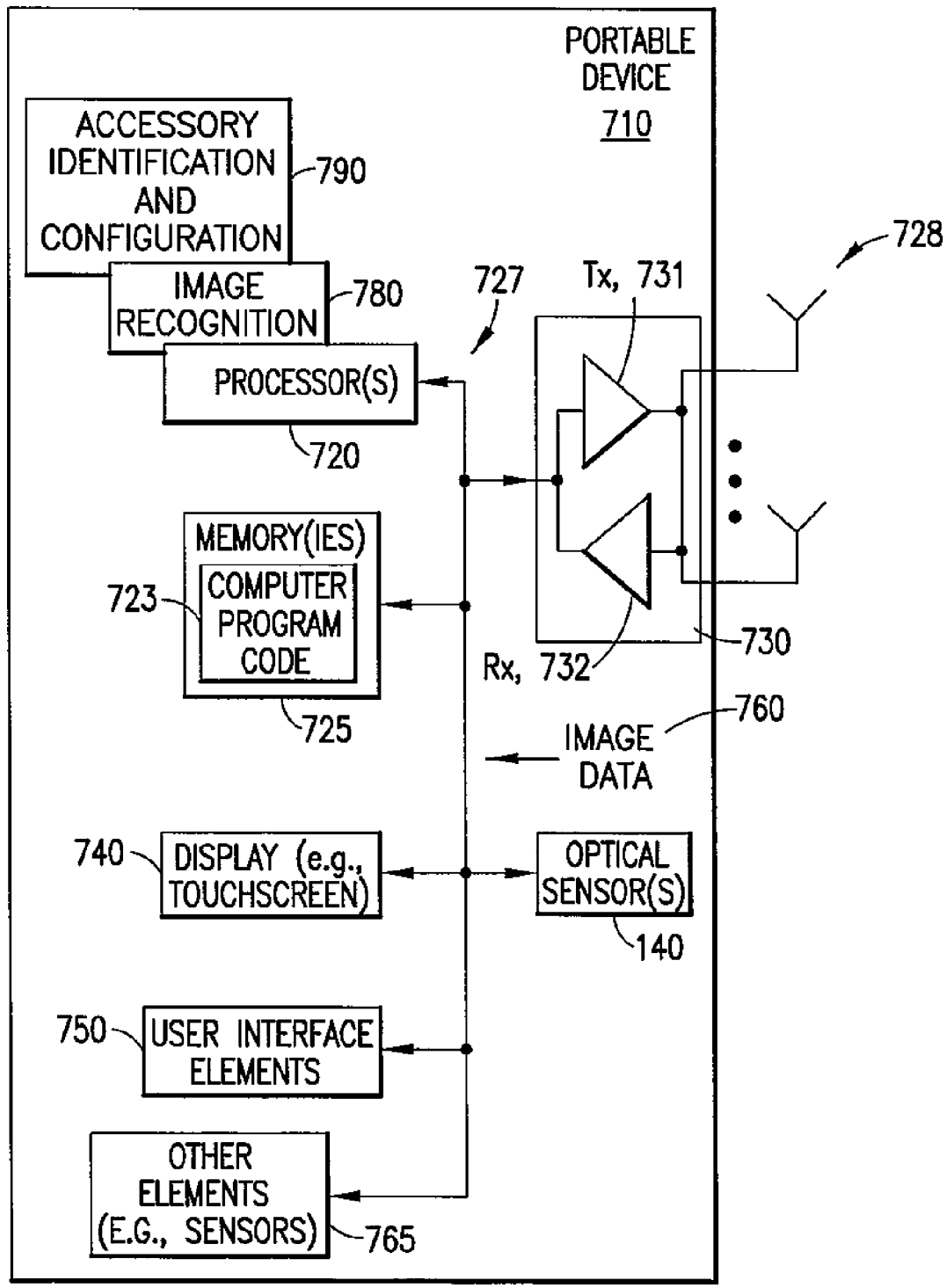
FIG. 14 illustrates and example portable device.
Figure 15A:
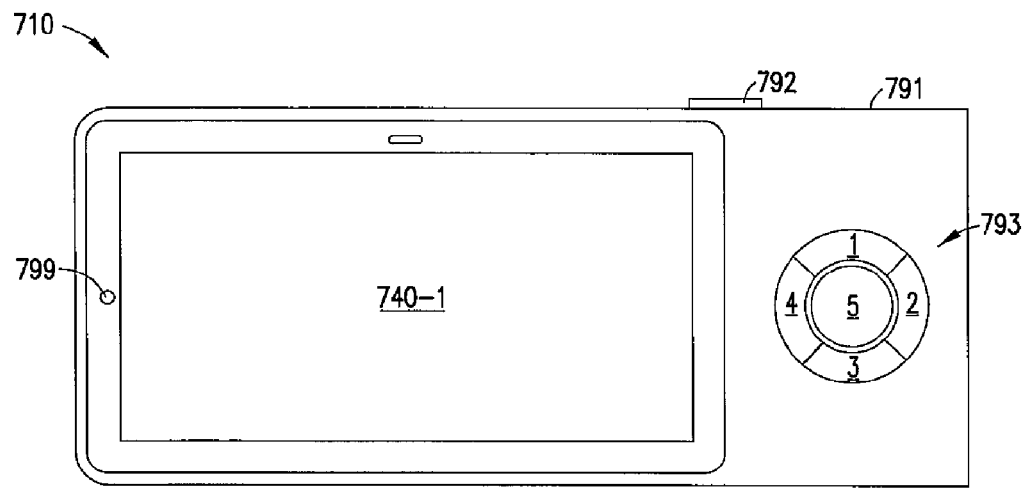
FIGS. 15A and 15B illustrate an example of a portable device.
Figure 15B:
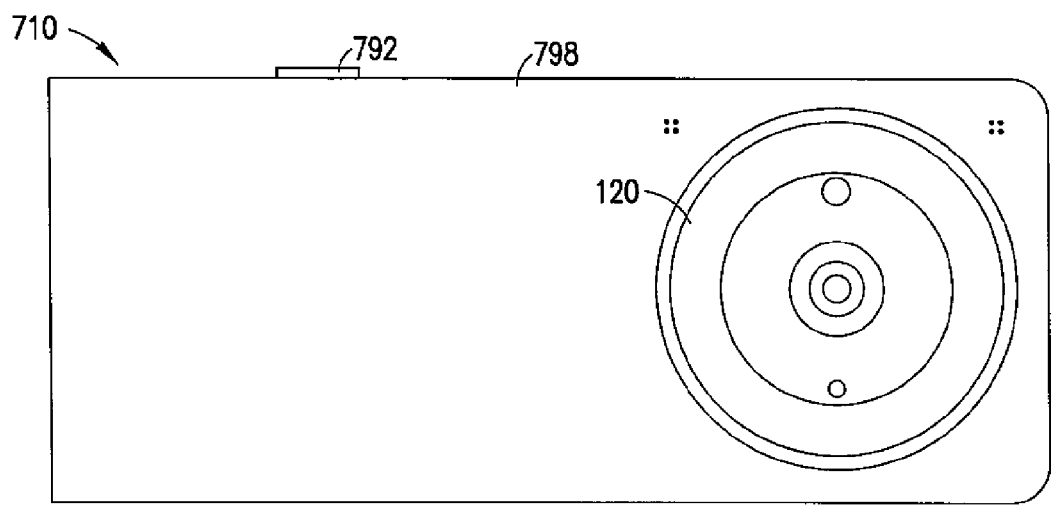

FIG. 14 illustrates possible internal electronic devices suitable for use with a portable device, and FIGS. 15A and 15B illustrate a back 791 and front 798, respectively, of the portable device 710. In FIG. 14, the portable device 710 in this example includes one or more antennas 728 (multiple antennas are shown), one or more processors 720, one or more memories 725, and one or more transceivers 730, a display 740 (such as a touchscreen), user interface elements (such as buttons) 750 and other elements 765 (such as sensors like light sensors, global positioning system sensors, or magnetic field, orientation, or proximity sensors), interconnected using one or more buses 727. The portable device 710 is typically a handheld device, but it is possible for non-handheld devices to be used with the exemplary embodiments. The one or more buses 727 may be any physical devices for interconnecting electronic elements, such as traces on a board, metal or other conductive runs on an integrated circuit, optic channels or elements, and the like. They may include data, memory, or control information. Each of the one or more transceivers 730 includes one or more transmitters (Tx) 731, one or more receivers (RX) 732, or both. The one or more memories include computer program code 723. The portable device 710 includes an accessory identification and configuration module 790 and an image recognition module 780. The modules 780 and 790 may be implemented in part as software, such that the one or more memories 725 and the computer program code 723 are configured to, with the one or more processors 720, cause the portable device 710 to perform one or more of the operations as described herein. The modules 780 and 790 may be implemented as hardware logic, such as in an integrated circuit, a gate array or other programmable device, discrete circuitry, and the like. The modules 780 or 790 could be implemented through some combination of computer program code 723 and hardware logic.

The portable device 710 includes one or more optical sensors 140. The one or more optical sensors 140 produce image data 760, using the two-dimensional array 155 of pixels 150. The image recognition module 780, in an exemplary embodiment, can process the image data 760 to determine an accessory based on the ID pattern captured in the image data 760.

The portable device also 710 includes in certain exemplary embodiments a display 740, which in FIG. 15A is a touchscreen 740-1. The portable device 710 may also include a number of user interface elements 750, which are illustrated as a shutter control 792 and a set 793 of buttons used, e.g., for selection and having up 1, right 2, down 3, left 4, and selection 5 buttons. These are merely exemplary and many other types of buttons and interface elements may be used. The portable device 710 also includes other elements 765 which may include many different types of sensors and may additionally include user feedback elements (e.g., LED 799, which can indicate the portable device 710 has power for instance).

The computer readable memory 725 may be of any type suitable to the local technical environment and may be implemented using any suitable data storage technology, such as semiconductor based memory devices, flash memory, magnetic memory devices and systems, optical memory devices and systems, fixed memory and removable memory. The processor(s) 720 may be of any type suitable to the local technical environment, and may include one or more of general purpose computers, special purpose computers, general or special purpose integrated circuits, microprocessors, digital signal processors (DSPs) and processors based on a multi-core processor architecture, as non-limiting examples.

The portable device 710 (and 100) may be any device that may use interchangeable elements, such as lenses. For instance, the portable device 710 could be a camera, smartphone, tablet, and the like. In addition to lenses, the accessories 170 may be sliders, a jog dial, a thumb wheel, a spare button, and the like.

Figure 16:
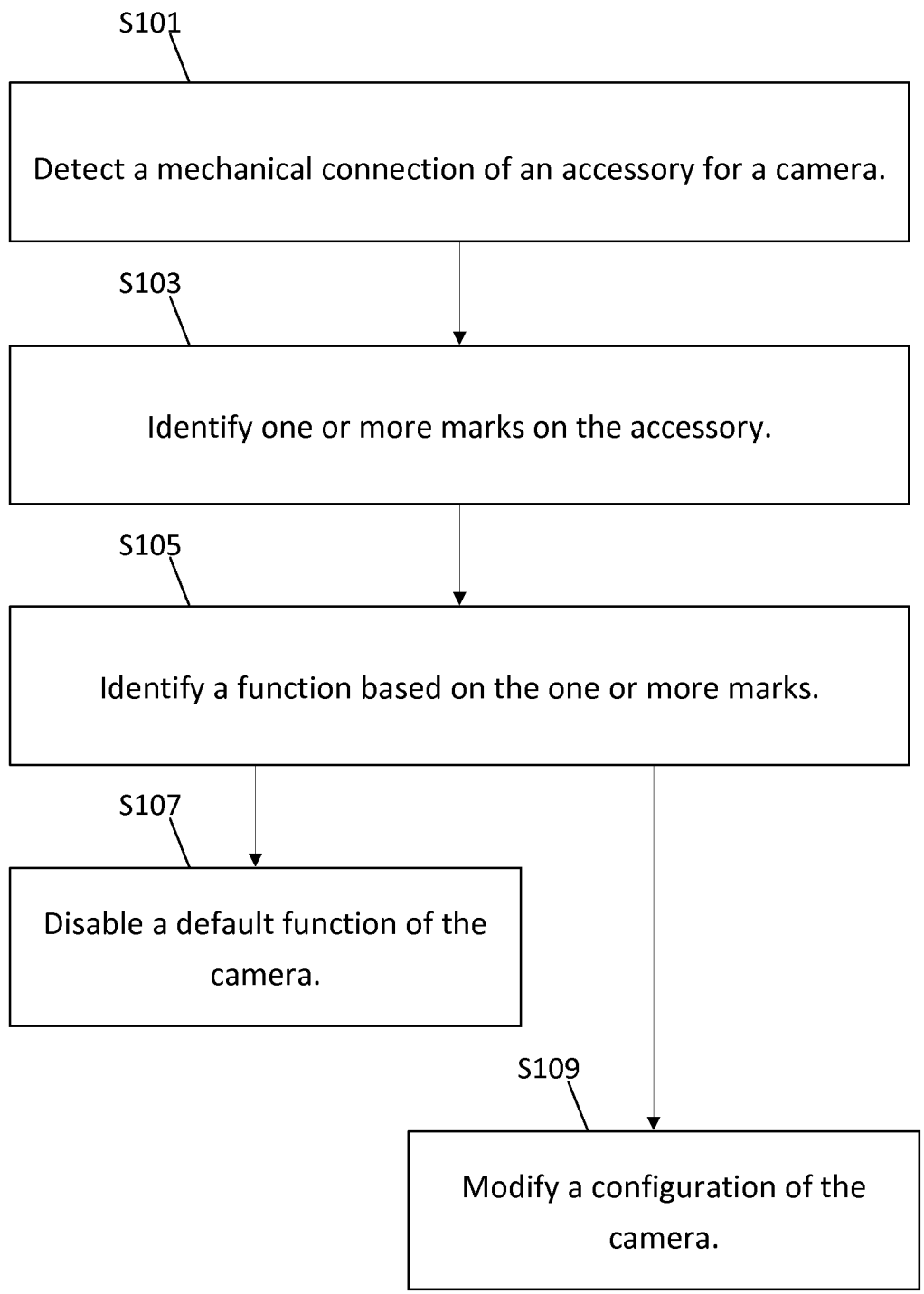
FIG. 16 illustrates a block diagram of an exemplary logic flow diagram performed by a portable device for accessory identification and configuration that illustrates the operation of an exemplary method, a result of execution of computer program instructions embodied on a computer readable memory, and/or functions performed by logic implemented in hardware, in accordance with exemplary embodiments herein.

FIG. 16 illustrates a block diagram is shown of an exemplary logic flow diagram performed by a portable device for accessory identification and configuration. The block operation of an exemplary method, a result of execution of computer program instructions embodied on a computer readable memory, and/or functions performed by logic implemented in hardware, in accordance with exemplary embodiments herein. The blocks may be considered to be interconnected means for performing the functions in the blocks. The blocks may be performed by a portable device 710, e.g., under control of at least the accessory identification and configuration module 790. Depending on implementation, the image recognition module 780 may also be used. For instance, in an exemplary embodiment, the accessory identification and configuration module 790 might cause the portable device 710 to perform all of the blocks. In another exemplary embodiment, the accessory identification and configuration module 790 may cause the portable device 710 to perform some or all acts.

At act S101, the portable device 710 detects a mechanical connection of an accessory for a camera. The accessory includes a physical component that performs a replacement function or a supplemental function for the camera. In an exemplary embodiment, the matrix sensor 140 is always capturing images, and the portable device 710 can therefore determine any time an accessory 170 is mated to the accessory mating surface 120 and additionally if the accessory mating surface 165 is moved relative to the surface 120 of the body 110. In other embodiments, the matrix sensor 140 captures images periodically. Other embodiments are also possible.

At act S103, the portable device 710 identifies one or more marks on the accessory. The portable device 710 captures, with a sensor 140 having a two dimensional array of pixels, an image of one or more optically-recognizable identification marks formed as part of a mating surface of an accessory.

In addition or alternatively, a user may rotate the body 185 (e.g., a barrel 195), which causes the accessory mating surface 165 on the body 185 to rotate relative to the fixed sensor 145 and fixed accessory mating surface 120 of the portable device 710. In terms of the user causing the accessory mating surface 165 to rotate, the portable device 710 can determine the rotation occurs and can perform action(s) based thereon. In an exemplary embodiment, the matrix sensor 140 operates continuously and therefore the image recognition module 780 can determine the rotation of the body 185. Other options are possible, such as having the matrix sensor 140 operate continuously but having the image recognition module 780 operate periodically (e.g., on a block of images from the matrix sensor 140, or having both the matrix sensor 140 and the image recognition module 780 operate periodically. In block 825, the portable device 710 determines the mating surface 165 on an accessory has moved using the multiple images. For instance, if a synchronization feature is used, the rotation of the feature could be determined using standard video processing techniques. Similarly, rotation of any ID patterns (such as ID patterns 220) can be determined, e.g., by comparing a single pixel in each of two subsequent images and determining if a feature of an ID pattern is in one but not in the other. Other techniques may also be used.

In act S105, the portable device 710 identifies a function of the configuration of the camera that corresponds to the one or more marks. The portable device 710 may disable the function that is identified or modify the configuration of the camera, or both. The portable device 710 determines from the captured image a specific one of a plurality of possible accessories 170 interchangeable for use with the apparatus. The portable device 710 performs image recognition on the captured image to determine a specific one of a plurality of codes. Each code uniquely identifies one of the accessories 170. The portable device 710 determines the specific accessory based on the code. An example of a code is illustrated, e.g., in reference to FIGS. 12A and 12B, where codes zero through 15 may be determined.

The portable device 710 performs image recognition on the captured image to determine a specific one of a plurality of shapes. Each shape uniquely identifies one of the accessories. For instance, a square could be interpreted as one accessory, while a triangle could be interpreted as a different unique accessory 170. Thus, the portable device 710 determines a specific accessory based on the specific shape. Furthermore, it should be noted that a set of shapes might be used. For instance, two ovals might be associated with one accessory, while two squares might be associated with a second accessory. As another example, an oval and a triangle might be associated with one accessory, while a square and a trapezoid might be associated with a second accessory. A set may include one shape or multiple shapes.

The portable device 710 performs image recognition on the captured image to determine a specific one of a plurality of data patterns. Each data pattern uniquely identifies one of the accessories. Illustratively, the data pattern may be a single line, two lines, three lines, and the like. The data pattern may be more complex, such as that shown in FIG. 13. The portable device 710 determines a specific accessory based on the specific data pattern.

Act S107, which is optional, illustrates the alternative in which the portable device 710 disables a default function of the camera. The default function may be replaced by replacement function provided by the accessory. The default function may interfere with the operation of the accessory. One example default function may include a flash integrated with the portable device 710, and the replacement function may be a wide angle lens that physically covers and interferes with the integrated flash or a specialty flash that replaces the integrated flash. Another example default function may include a zoom function integrated with the portable device 710, and the replacement function is a multiple lens array that provides zooming functions. Another example default function may include wireless communication, and the replacement function is a metal dial that interferences with the wireless communication. Another example default function is a filter integrated with the portable device 710, and the replacement function is provided by a filter hood that holds one or more filters.

Act S109, which is optional, illustrates the alternative in which the portable device 710 modifies a configuration of the portable device 710. The portable device 710 performs one or more configuration operations based on the specific accessory. As an example of a configuration operation, the device 100/710 might determine a specific "tuned" characteristic of the image sensor (for taking a picture) appropriate for an accessory based on the innate characteristics of that accessory.

In the example of an accessory lens, for example if a wide angle lens is used in the device, the device 100/710 might correct lens optical parameters like radial distortion to provide a better image. More specifically, if an accessory 170 includes traditional optics to capture a wide-angle visual field (e.g., a fisheye lens) the image sensor can be configured to compensate for unavoidable optical distortions or vignetting (e.g., a reduction of an image's brightness or saturation at the periphery compared to the image center) by digitally manipulating the image while the image in the image processing pipeline. Another example might be that accessories are available in different colors and a device UI is changing color or different feature set in the UI.

In another example, the accessory 170 may be a dial for the lens and the configuration is a sensitivity of inputs received from the dial. For example, the sensitivity may be increased or decreased based on the user grip on the accessory 170. In one example, the accessory 170 may be a multiple lens array, and the configuration is an additional mode for the multiple lens array. The additional mode may be a standby mode that is initiated by placing the multiple lens array in a predetermined position. In one example, the accessory 170 is a trigger interface and the configuration activates a touch control or multi-setting trigger of the trigger interface. The touch control may allow the user to activate a zoom function. The multi-setting trigger may allow an intermediate command (e.g., burst image, red eye control, or timer) at an intermediate position of the trigger.

The accessory 170 may be also an "upgrade kit accessory" to unlock more feature(s) in the device 100 or 710. Or, if an accessory is designed to be used in situations where the device should not operate its radios (e.g., to save power, or in situations where one must not produce any radio frequency energy), the device 100/710 could configure the device to always turn its radios off in response to the accessory being installed. The portable device 710 determines the configuration operations based on the specific accessory. For instance, there could be a table of accessories and corresponding configuration operations. It should be noted that a single image is or multiple images may be used.

The portable device 710 may update configuration of the portable device based on movement of the mating surface. One possible updating of configuration would be that a zoom function could be activated and acted upon as the user rotates the barrel 195 relative to the device. Other examples include focus and applying one or more filters. It is also possible to cycle though data overlays that appear in the UI (user interface) as an overlay on the image or video being captured. The dial could also be used as a way to cycle though menus in a UI just like a jog dial or click wheel.

Figure 17A:
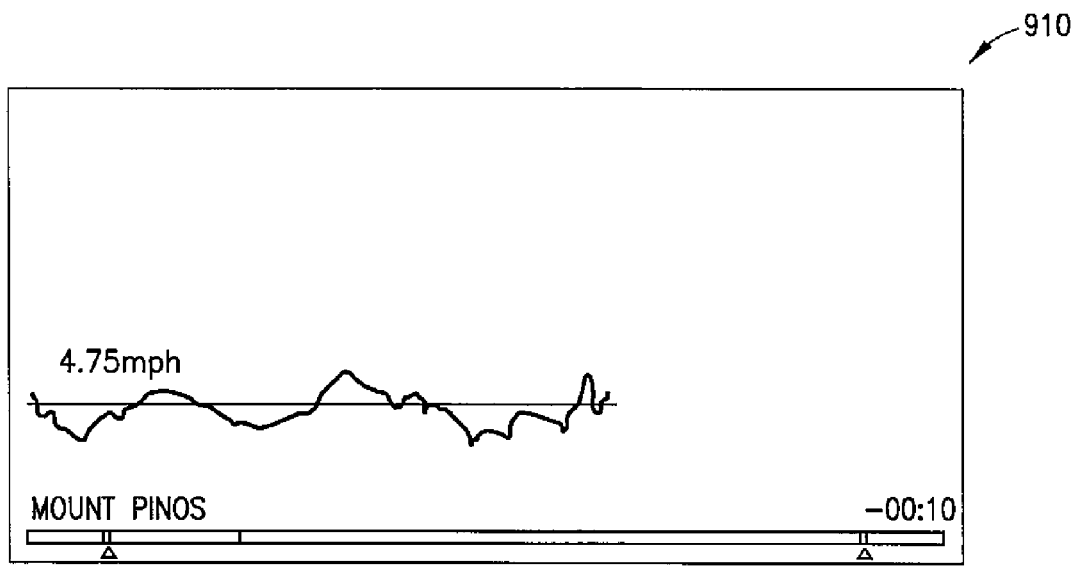
FIGS. 17A, 17B, 18A, and 18B, illustrate possible configurations of a portable device that might be updated based on rotation of a portion of an accessory (and the corresponding rotation of multiple optically-recognizable ID marks).
Figure 17B:
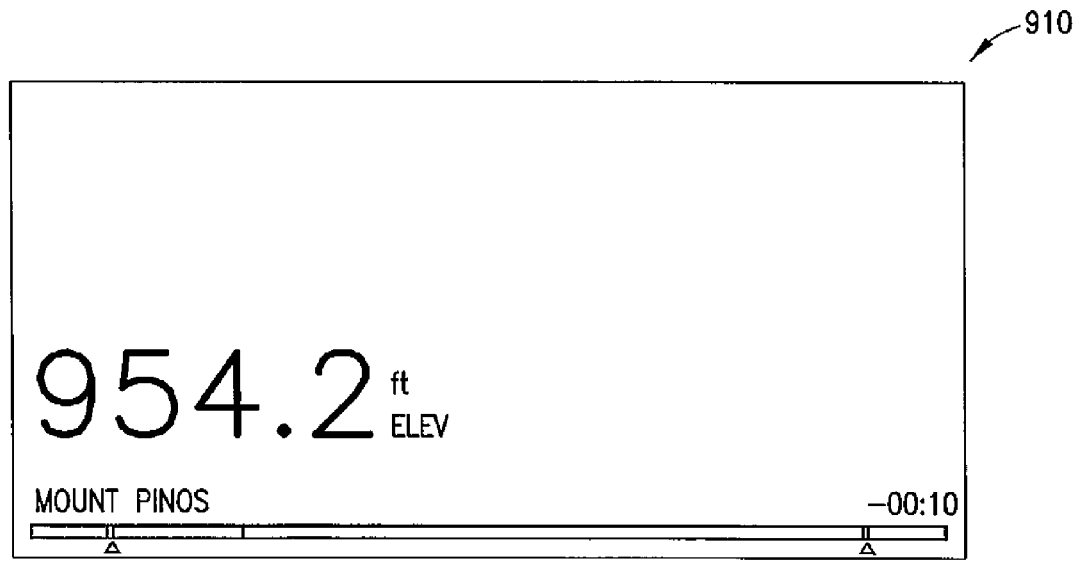
Figure 18A:
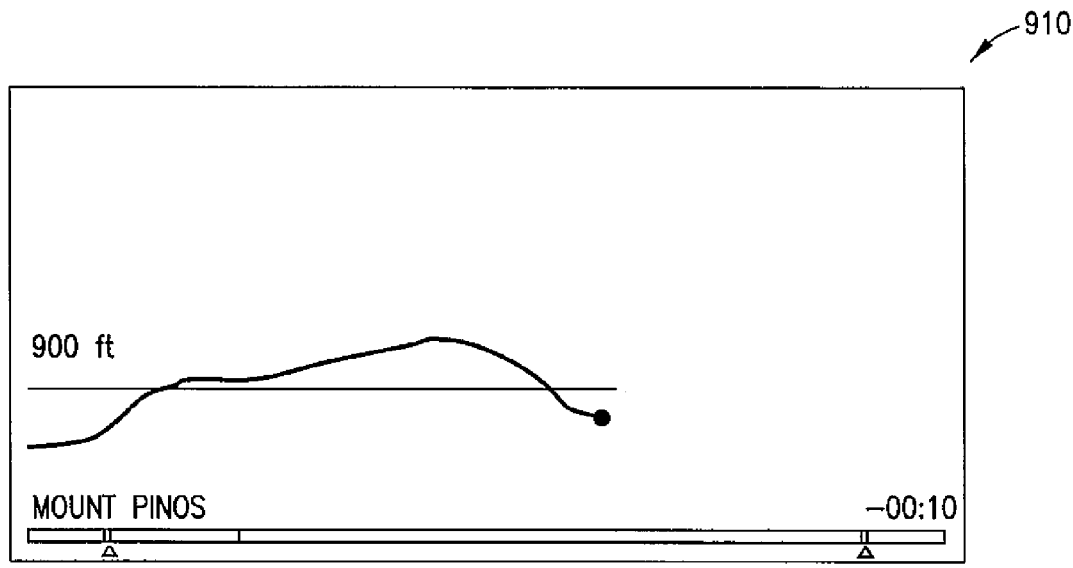
Figure 18B:
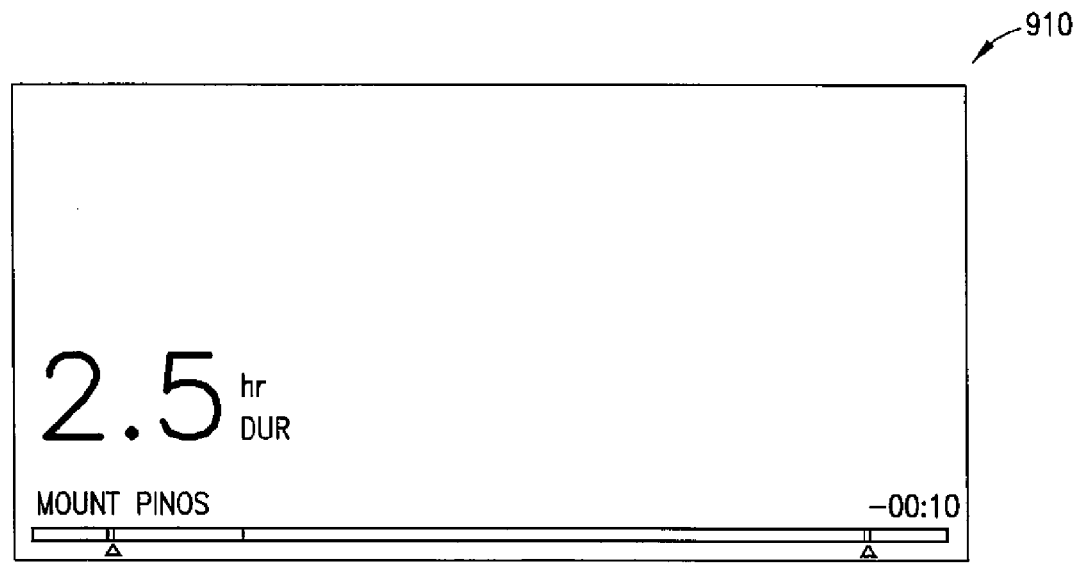

FIGS. 17A, 17B, 18A, and 18B illustrate possible configurations of a portable device that might be updated based on rotation of a portion of an accessory (and the corresponding rotation of multiple optically-recognizable ID marks). In this example, a UI 910 that would be shown on the touchscreen 740-1 is shown. Each of the FIGS. 17A, 17B, 18A, and 18B illustrate an overlay that is selected by rotating a barrel 195 and therefore rotating multiple optically-recognizable ID marks on the accessory mating surface 165 of the accessory 170. FIG. 17A illustrates an overlay of a speed graph and an average speed of 4.75 mph (miles per hour) for a person skiing "Mount Pinos". By rotating the barrel 195 in a particular way (e.g., clockwise), the user can select the overlay of elevation, which is shown as 954.2 ft (feet) in FIG. 17B. Continuing to rotate the barrel 195 in the particular way causes the portable device 100/710 to show an overlay of an elevation graph, where the current elevation is 900 ft (see FIG. 18A). Similarly, continuing to rotate the barrel 195 in the particular way causes the portable device 100/710 to show a duration (DUR) of 2.5 hr (hours) in FIG. 18B. Similar techniques might be used to allow a user to select other interface elements (e.g., from a menu, pictures or videos in a set of files, and the like).

Figure 19:
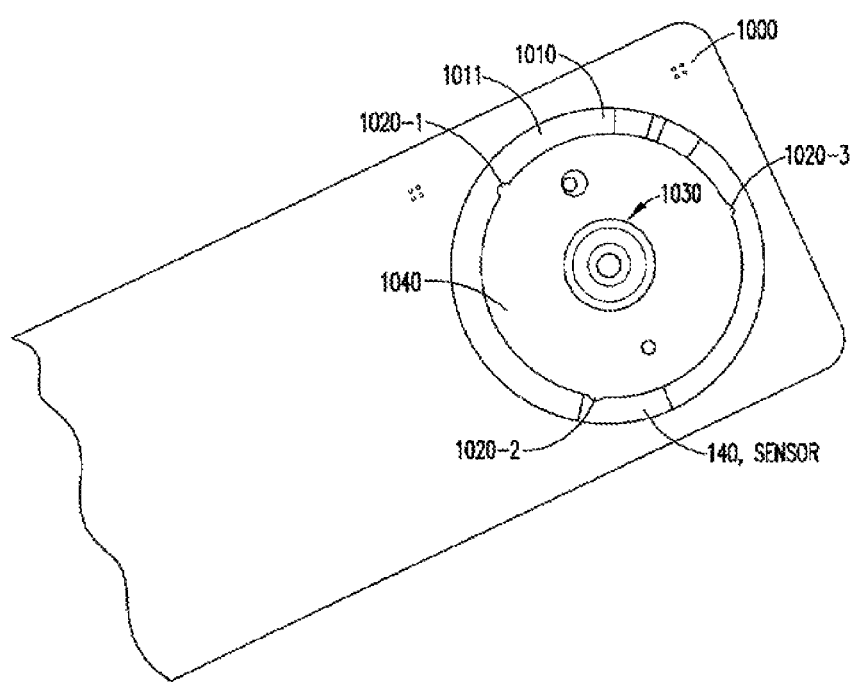
FIG. 19 is an example of a mobile phone having an exemplary accessory mating surface, a groove in this example.

FIG. 19 is an example of a mobile phone 1000 having an example of an accessory mating surface. In this example, the accessory mating surface is a groove 1010 having a surface 1011. The mobile phone has an internal camera lens system 1030. The mobile phone 1000 also has a surface 1040 over which an accessory 170 would be placed. Three balls 1020-1, 1020-2, and 1020-3 are shown and these are used to retain an accessory as described below. It is noted that the surface 1011 and groove 1010 are configured to align with at least a surface of a dial 1100 (see FIG. 20A) as described below.

Figure 20A:
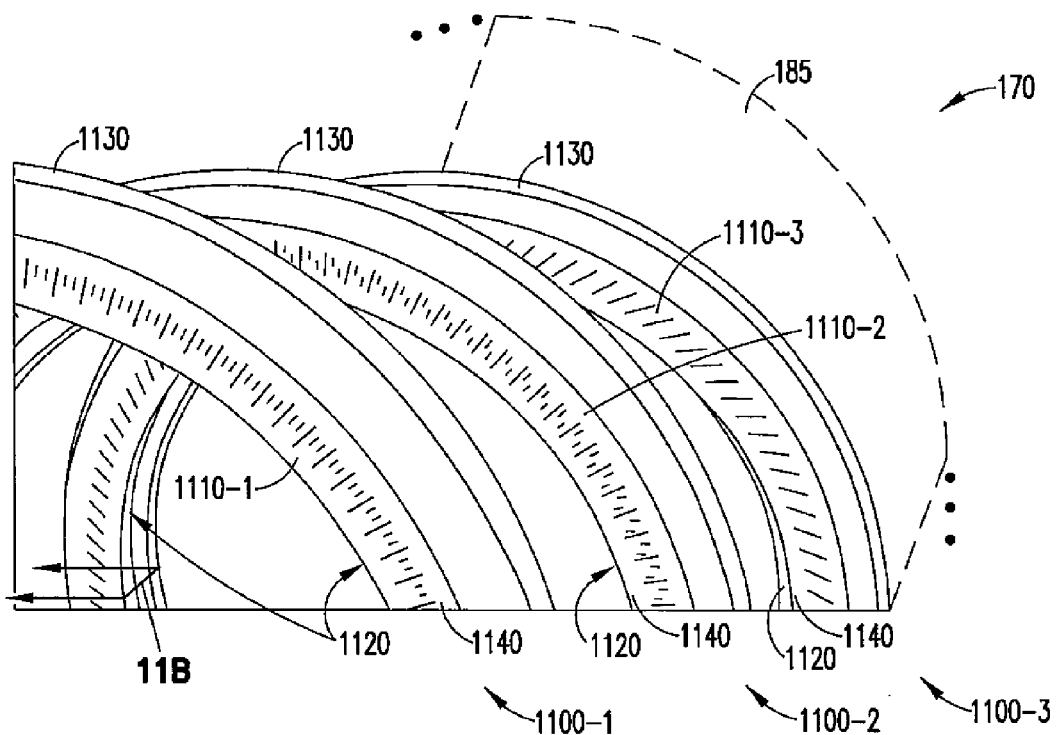
FIG. 20A illustrates an example of three dials.
Figure 20B:
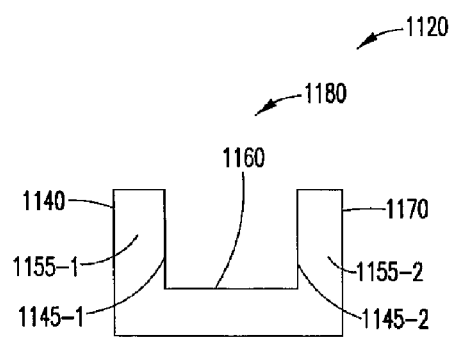
FIG. 20B is a cross section of a dial in FIG. 20A.

FIG. 20A illustrates an example of three dials 1100-1, 1100-2, and 1100-3 that could align with and fit into the groove 1010 in FIG. 10 and also illustrates different identification patterns 1110. The dials 1100 may be used on any accessory 170. Dials 1100-1 and 1100-2 have identification patterns 1110-1 and 1110-2 that are identification patterns and are repeated on a lower side 1140 of the dial 1100. That is, the identification patterns are identical and are repeated multiple times. The identification pattern 1110-3 for dial 1100-3 has only a single line in a repeated pattern. Each ring 1100 has an outer periphery 1130 and an inner periphery 1120. The outer periphery 1130 is corrugated in this example, but could also be smooth or knurled. Integral with the inner periphery 1120 (see FIG. 11B, which is a cross section of a dial in FIG. 11A) is a race 1180 (or surface) that includes inner surfaces 1145-1 and 1145-2 and a surface 1160, each of which may mate with a ball 1020 when the ring 1100 is placed at least in part in the groove 1010 in FIG. 19. The inner periphery includes rims 1155-1 and 1155-2. Rim 1155-1 has the lower side 1140 and the inner surface 1145-1, and rim 1155-2 has an upper side 1170 and an inner side 1145-2.

In the example of FIG. 20A, the accessory 170 is shown via dashed lines, as is the body of the accessory 170. That it, the accessory 170 is shown going "into" the page in this example. The outer side 1170 would couple the rest of the accessory 170 with the dial 1100.

Figure 21:
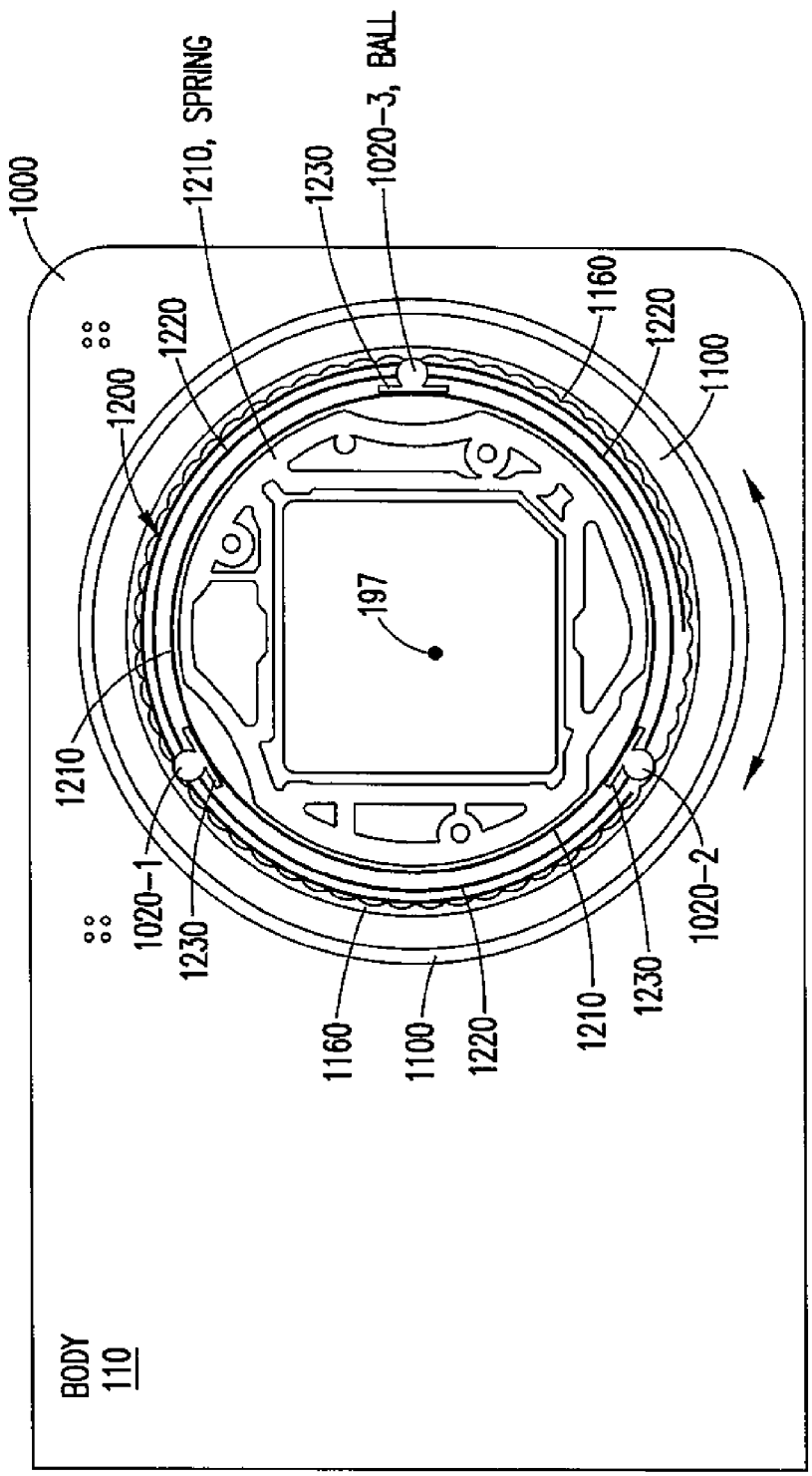
FIG. 21 is an illustration of the mobile phone and is used to illustrate a dial.

FIG. 21 is an illustration of the mobile phone 1000 and is used to illustrate a dial 1100 that is placed into the groove shown in FIG. 19. A spring ball retention system 1200 is also illustrated in FIG. 21, and the spring ball retention system 1200 comprises a ring 1220 through which balls 1020 project. Each ball 1020 is connected to the spring 1210 via a corresponding one of the holding elements 1230-1, 1230-2, or 1230-3. A user pushes the accessory 170 and specifically the rim 1155-1 past the balls 1020 in order to connect the accessory 170 to the mobile phone 1000. During this process, each ball 1020 compresses the spring 1210 until the rim 1155-1 is past the balls, when the balls 1020 settle between the rims 1155-1 and 1155-2 and the spring 1210 at least partially decompresses from its most compressed point. It can be seen that the inner surface 1160 of the race 1180 has a corrugated surface in this example where each corrugation mates with a surface of a ball 1020. A user can move the dial 1100 clockwise or counter clockwise relative to the axis 197. Movement of the dial 1100 can be detected because the patterns 1110 also move relative to a surface 1011 on the body 110. It is noted that the surface 1140 of the dial 1100 may or may not contact the surface 1011 at any point, as a distance from a center point of the balls 1020 and the size of the rim 1155-1 may be defined so that the surfaces 1140, 1011 touch or do not touch.

The position circuitry 121 generates data indicative of the location of the computing device 122. In addition or in the alternative to GPS, the position circuitry may include a dead reckoning-type system, cellular location, or combinations of these or other systems. The positioning circuitry may include suitable sensing devices that measure the traveling distance, speed, direction, and so on, of the computing device 122. The positioning system may also include a receiver and correlation chip to obtain a GPS signal.

The controller 101 may include a general processor, digital signal processor, an application specific integrated circuit (ASIC), field programmable gate array (FPGA), analog circuit, digital circuit, combinations thereof, or other now known or later developed processor. The controller 101 may be a single device or combinations of devices, such as associated with a network, distributed processing, or cloud computing. The computing device processor 200 may also be configured to cause an apparatus to at least perform at least one of methods described above.

The memory 126 may be a volatile memory or a non-volatile memory. The memory 126 may include one or more of a read only memory (ROM), random access memory (RAM), a flash memory, an electronic erasable program read only memory (EEPROM), or other type of memory. The memory 126 may be removable from the computing device 122, such as a secure digital (SD) memory card.

The communication interface 129 may include any operable connection. An operable connection may be one in which signals, physical communications, and/or logical communications may be sent and/or received. An operable connection may include a physical interface, an electrical interface, and/or a data interface. The communication interface 129 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving data for one or more identification marks from a camera accessory;
   identifying the camera accessory from the one or more identification marks;
   identifying an interfering camera function that interferes with the camera accessory; and
   modifying, using a processor, a camera configuration to account for the interfering camera function.

2. The method of claim 1, further comprising:
   accessing a lookup table according to the one or more identification marks to receive data for a type of the camera accessory.

3. The method of claim 1, further comprising:
   collecting optical data from a sensor for the one or more identification marks.

4. The method of claim 1, wherein modifying the camera configuration comprises:
   selecting a mode as part of the camera configuration.

5. The method of claim 1, wherein modifying the camera configuration comprises:
disabling a camera component as part of the camera configuration.

6. The method of claim 1, wherein modifying the camera configuration comprises:
modifying wireless communication as part of the camera configuration.

7. The method of claim 1, wherein a mating surface associated with the camera accessory includes the one or more identification marks.

8. The method of claim 1, wherein modifying the camera configuration is based on a physical component of the camera accessory.

9. The method of claim 1, wherein the camera accessory replaces a default function that is disabled by the camera configuration.

10. A method comprising:
receiving data for one or more identification marks from an accessory;
identifying the accessory from the one or more identification marks;
identifying an interfering function that interferes with the accessory; and
modifying, using a processor, a configuration to account for the interfering function.

11. The method of claim 10, further comprising:
accessing a lookup table according to the one or more identification marks to receive data for a type of the accessory.

12. The method of claim 10, further comprising:
collecting optical data from a sensor for the one or more identification marks.

13. The method of claim 10, wherein modifying the configuration comprises:
selecting a mode as part of the configuration.

14. The method of claim 10, wherein modifying the configuration comprises:
disabling a component as part of the configuration.

15. The method of claim 10, wherein modifying the configuration comprises:
modifying wireless communication as part of the configuration.

16. The method of claim 10, wherein a mating surface associated with the accessory includes the one or more identification marks.

17. An apparatus comprising:
a sensor configured to collect data for one or more identification marks from an accessory; and
a controller configured to identify the accessory from the one or more identification marks and modify a configuration to account for an interfering function that interferes with the accessory.

18. The apparatus of claim 17, wherein modifying the configuration comprises:
selecting a mode as part of the configuration.

19. The apparatus of claim 17, wherein modifying the configuration comprises:
disabling a component as part of the configuration.

20. The apparatus of claim 17, wherein modifying the configuration comprises:
modifying wireless communication as part of the configuration.

* * * * *